(12) United States Patent
Watanabe

(10) Patent No.: US 8,432,996 B2
(45) Date of Patent: Apr. 30, 2013

(54) TRANSMITTER

(75) Inventor: Ryosuke Watanabe, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 275 days.

(21) Appl. No.: 12/890,732

(22) Filed: Sep. 27, 2010

(65) Prior Publication Data

US 2011/0075756 A1    Mar. 31, 2011

(30) Foreign Application Priority Data

Sep. 28, 2009   (JP) ................................ 2009-222419

(51) Int. Cl.
*H04L 27/28*   (2006.01)

(52) U.S. Cl.
USPC ......................................................... 375/295

(58) Field of Classification Search ........................ None
See application file for complete search history.

(56) References Cited

U.S. PATENT DOCUMENTS

| | | | | |
|---|---|---|---|---|
| 6,657,950 B1 * | 12/2003 | Jones et al. | ................ | 370/208 |
| 7,929,617 B2 * | 4/2011 | Green | ................ | 375/259 |
| 8,098,744 B2 * | 1/2012 | Chen et al. | ................ | 375/260 |
| 2004/0117764 A1 * | 6/2004 | Sinha et al. | ................ | 717/110 |
| 2005/0038842 A1 * | 2/2005 | Stoye | ................ | 708/306 |
| 2008/0031376 A1 * | 2/2008 | Ban | ................ | 375/271 |
| 2010/0046648 A1 * | 2/2010 | Nerella et al. | ................ | 375/260 |
| 2011/0305185 A1 * | 12/2011 | Kwon et al. | ................ | 370/312 |
| 2012/0166119 A1 * | 6/2012 | Nentwig et al. | ................ | 702/66 |

FOREIGN PATENT DOCUMENTS

JP    2003-134083 A    5/2003

\* cited by examiner

*Primary Examiner* — David C. Payne
*Assistant Examiner* — Bahman Badipour
(74) *Attorney, Agent, or Firm* — Fujitsu Patent Center

(57) ABSTRACT

A transmitter includes an OFDM symbol generator for generating an effective symbol including a plurality of sub-carriers orthogonal to each other in frequency and sequentially generating an OFDM symbol in which a signal in a first period from a first end of the effective symbol is added to a second end of the effective symbol as a guard interval, and a convolution filter for performing an convolution operation on data strings at a plurality of sampling points of the OFDM symbol, wherein when the convolution filter performs a convolution operation on the first data strings including a data string at the first end of the effective symbol, the convolution filter performs the convolution operation on the first data strings in which a data string at the second end of the effective symbol is cyclically added to a data string at the first end.

11 Claims, 19 Drawing Sheets

FIG. 6

| Din→ | reg1 | reg2 | reg3 | reg4 | reg5 | reg6 | reg7 | reg8 | reg9 |
|---|---|---|---|---|---|---|---|---|---|
| CLK | | | | | 101 | | | | |
| 1 | Xt1(n-1) | Xt1(n-2) | Xt1(n-3) | Xt1(n-4) | Xt1(n-5) | Xt1(n-6) | Xt1(n-7) | Xt1(n-8) | Xt1(n-9) |
| 2 | Xt1(n) | Xt1(n-1) | Xt1(n-2) | Xt1(n-3) | Xt1(n-4) | Xt1(n-5) | Xt1(n-6) | Xt1(n-7) | Xt1(n-8) |
| 3 | Xc2(1) | Xt1(n) | Xt1(n-1) | Xt1(n-2) | Xt1(n-3) | Xt1(n-4) | Xt1(n-5) | Xt1(n-6) | Xt1(n-7) |
| 4 | Xc2(2) | Xc2(1) | Xt1(n) | Xt1(n-1) | Xt1(n-2) | Xt1(n-3) | Xt1(n-4) | Xt1(n-5) | Xt1(n-6) |
| 5 | Xc2(3) | Xc2(2) | Xc2(1) | Xt1(n) | Xt1(n-1) | Xt1(n-2) | Xt1(n-3) | Xt1(n-4) | Xt1(n-5) |
| 6 | Xc2(4) | Xc2(3) | Xc2(2) | Xc2(1) | Xt1(n) | Xt1(n-1) | Xt1(n-2) | Xt1(n-3) | Xt1(n-4) |
| 7 | Xc2(5) | Xc2(4) | Xc2(3) | Xc2(2) | Xc2(1) | Xt1(n) | Xt1(n-1) | Xt1(n-2) | Xt1(n-3) |
| 8 | Xc2(6) | Xc2(5) | Xc2(4) | Xc2(3) | Xc2(2) | Xc2(1) | Xt1(n) | Xt1(n-1) | Xt1(n-2) |
| 9 | Xc2(7) | Xc2(6) | Xc2(5) | Xc2(4) | Xc2(3) | Xc2(2) | Xc2(1) | Xt1(n) | Xt1(n-1) |
| 10 | Xc2(8) | Xc2(7) | Xc2(6) | Xc2(5) | Xc2(4) | Xc2(3) | Xc2(2) | Xc2(1) | Xt1(n) |
| 11 | Xc2(9) | Xc2(8) | Xc2(7) | Xc2(6) | Xc2(5) | Xc2(4) | Xc2(3) | Xc2(2) | Xc2(1) |

FIG. 10

| | rega1 | rega2 | rega3 | rega4 | | | | | |
|---|---|---|---|---|---|---|---|---|---|
| Din_a → | | | | | reg5 | reg6 | reg7 | reg8 | reg9 |
| Din_b → | regb1 | regb2 | regb3 | regb4 | | | | | |

201

| CLK | S1 | | | | | | | | | |
|---|---|---|---|---|---|---|---|---|---|---|
| 1 | | Xt1(n-1) | Xt1(n-2) | Xt1(n-3) | Xt1(n-4) | Xt1(n-5) | Xt1(n-6) | Xt1(n-7) | Xt1(n-8) | Xt1(n-9) |
| | B → | Xt1(n-1) | Xt1(n-2) | Xt1(n-3) | Xt1(n-4) | | | | | |
| 2 | | Xt1(n) | Xt1(n-1) | Xt1(n-2) | Xt1(n-3) | Xt1(n-4) | Xt1(n-5) | Xt1(n-6) | Xt1(n-7) | Xt1(n-8) |
| | B → | Xt1(n) | Xt1(n-1) | Xt1(n-2) | Xt1(n-3) | | | | | |
| 3 | A → | Xt1(1) | Xt1(n) | Xt1(n-1) | Xt1(n-2) | Xt1(n-3) | Xt1(n-4) | Xt1(n-5) | Xt1(n-6) | Xt1(n-7) |
| | | Xc2(1) | Xt1(n) | Xt1(n-1) | Xt1(n-2) | | | | | |
| 4 | A → | Xt1(2) | Xt1(1) | Xt1(n) | Xt1(n-1) | Xt1(n-2) | Xt1(n-3) | Xt1(n-4) | Xt1(n-5) | Xt1(n-6) |
| | | Xc2(2) | Xc2(1) | Xt1(n) | Xt1(n-1) | | | | | |
| 5 | A → | Xt1(3) | Xt1(2) | Xt1(1) | Xt1(n) | Xt1(n-1) | Xt1(n-2) | Xt1(n-3) | Xt1(n-4) | Xt1(n-5) |
| | | Xc2(3) | Xc2(2) | Xc2(1) | Xt1(n) | | | | | |
| 6 | A → | Xt1(4) | Xt1(3) | Xt1(2) | Xt1(1) | Xt1(n) | Xt1(n-1) | Xt1(n-2) | Xt1(n-3) | Xt1(n-4) |
| | | Xc2(4) | Xc2(3) | Xc2(2) | Xc2(1) | | | | | |
| 7 | | Xc2(5) | Xt1(4) | Xt1(3) | Xt1(2) | Xc2(1) | Xt1(n) | Xt1(n-1) | Xt1(n-2) | Xt1(n-3) |
| | B → | Xc2(5) | Xc2(4) | Xc2(3) | Xc2(2) | | | | | |
| 8 | | Xc2(6) | Xc2(5) | Xc2(4) | Xc2(3) | Xc2(2) | Xc2(1) | Xt1(n) | Xt1(n-1) | Xt1(n-2) |
| | B → | Xc2(6) | Xc2(5) | Xc2(4) | Xc2(3) | | | | | |
| ⋮ | | | | | | | | | | |
| 11 | | Xc2(9) | Xc2(8) | Xc2(7) | Xc2(6) | Xc2(5) | Xc2(4) | Xc2(3) | Xc2(2) | Xc2(1) |
| | B → | Xc2(9) | Xc2(8) | Xc2(7) | Xc2(6) | | | | | |

TRANSMITTER

CROSS REFERENCE TO RELATED APPLICATION

This application is based upon and claims the benefit of priority from the prior Japanese Patent Application NO. 2009-222419 filed on Sep. 28, 2009, the entire contents of which are incorporated herein by reference.

FIELD

The embodiments discussed herein are related to a transmitter.

BACKGROUND

Transmission schemes such as Orthogonal Frequency Division Multiplexing (OFDM) and Orthogonal Frequency Division Multiple Access (OFDMA) schemes (herein after referred to as OFDM) have come to attention in these years.

FIG. 1 is a block diagram illustrating part of processing performed in a transmitter using a transmission scheme such as OFDM.

In FIG. 1, an OFDM symbol generator 1 includes an inverse fast Fourier transform (IFFT) section 11 and a cyclic prefix (CP) adding section 12. The IFFT section 11 performs inverse fast Fourier transform on multiple transmitter signals Sf at a time to generate an effective symbol Xt which is a time-domain signal including multiple sub-carriers that are orthogonal to each other in frequency.

FIGS. 2A, 2B and 2C illustrate a signal generated by the processing illustrated in FIG. 1 and its data. FIG. 2A is a schematic diagram of a time-domain signal and FIG. 2B illustrates a specific signal waveform corresponding to FIG. 2A. As illustrated in FIG. 2B, the signal is represented by discrete data strings allocated at even intervals in the time domain. Since an effective symbol Xt is a superposition of harmonic signals that have a period that is an integral sub-multiple of an effective symbol length due to the nature of inverse Fourier transform, signal data De1 and De2 at both ends of the effective symbol Xt have continuous phases.

As illustrated in FIG. 2A, the CP adding section 12 copies the tail end section of an effective symbol Xt and adds the tail section to the head end section of the effective symbol Xt as a cyclic prefix Xc to generate an OFDM symbol which is a unit of transmission in the OFDM scheme. In this way, the OFDM symbol generator 1 sequentially generates OFDM symbols X1, X2, . . . in which cyclic prefixes Xc1, Xc2, . . . are added to effective symbols Xt1, Xt2, . . . as illustrated in FIG. 2C for multiple frequency-domain signals Sf.

A cyclic prefix CP, also known as guard interval, is a redundant signal added in order to reduce interference with a delay wave due to multipath propagation on a transmission line and is removed at a receiving end.

FIGS. 3A to 3D illustrate the relationship between signal processing in an upsampling processor 2 and digital-to-analog (D-A) conversion. The upsampling processor 2 performs interpolation on time-domain discrete data included in the OFDM symbol X illustrated in FIG. 3A to increase the number of pieces of signal data (the number of samples), thereby increasing the sampling frequency of OFDM symbol X.

FIG. 3B illustrates an analog signal waveform resulting from D-A conversion of the OFDM symbol X depicted in FIG. 3A by a D-A converter 3. If the sampling frequency of the OFDM symbol X is low, a hold period Th1 will be long, which generates distortions and high-frequency components in the frequency spectrum of the OFDM symbol X. In order to reduce such distortions and components, the upsampling processor 2 needs to perform processing for increasing the sampling frequency of the OFDM symbol X.

The upsampling processor 2 includes an upsampling section 21 and a filter circuit 22.

Specifically, the upsampling section 21 inserts 0 points, p1, p2, . . . as additional sampling points between sampling points of the OFDM symbol X as illustrated in FIG. 3C. For example, inserting three 0 points between sampling points will increase the sampling frequency by a factor of 4. The OFDM symbol X including the 0 points inserted as illustrated in FIG. 3C is subjected to filtering by the low-pass filter circuit 22 to remove high-frequency components from the OFDM symbol X. As a result, the OFDM symbol X with appropriately interpolated points as illustrated in FIG. 3D is generated. One approach to implementing the filtering is a Finite Impulse Response (FIR) filter that performs convolution operations on a sampled signal in continuous periods and a filtering coefficient. A filter that performs such convolution operations will be hereinafter referred to as a convolution filter.

Since the time period Th2 between sampling points of the OFDM symbol X is reduced, the hold period Th2 is short even after the D-A conversion. Accordingly, distortions and high-frequency components in the frequency spectrum of the D-A converted OFDM symbol X are suppressed. Then, the OFDM symbol X is converted by a high-frequency circuit RF to an OFDM transmission signal and is transmitted through an antenna 4.

On the other hand, the number of inverse Fourier transform points may be increased to increase the bandwidth for the transform to increase the sampling frequency of the transformed effective symbol Xt. However, this increases the circuit size of the IFFT section 11. Therefore, in order to keep the circuit size small, upsampling needs to be performed in the transmitter.

Japanese Laid-Open Patent Publication No. 2003-134083, for example, describes the circumstances described above.

However, when symbols X1, X2, . . . are convolved using the upsampling in the filter circuit 22, data strings at the boundary between symbols to be convoluted include a data string of an adjacent symbol and therefore data interference occurs in the convolution operation, which may result in an error such as a bit error at a receiver.

SUMMARY

According to one aspect, a transmitter includes an OFDM symbol generator for generating an effective symbol including a plurality of sub-carriers orthogonal to each other in frequency by applying inverse Fourier transform to a plurality of transmitter signals, and sequentially generating an OFDM symbol in which a signal in a first period from a first end of the effective symbol is added to a second end of the effective symbol as a guard interval, the second end being the other end of the effective symbol, and a convolution filter for performing an convolution operation on data strings at a plurality of sampling points of the OFDM symbol, the convolution operation being performed on as many first data strings as a certain number of taps at a time, wherein when the convolution filter performs a convolution operation on the first data strings including a data string at the first end of the effective symbol, the convolution filter performs the convolution operation on the first data strings in which a data string at the second end of the effective symbol is cyclically added to a data string at the first end.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF THE DRAWINGS

FIG. 1 is a block diagram illustrating part of processing performed in a transmitter using OFDM or the like;

FIG. 6 is a diagram illustrating data stored in a shift register 101 in FIG. 4 at each certain clock pulse;

FIG. 10 is a diagram illustrating data stored in a shift register 201 in FIG. 8 at each certain clock pulse;

DESCRIPTION OF EMBODIMENTS

Embodiments will be described below with reference to drawings.

[Typical Convolution Filter and Intersymbol Interference]

Figure 4:
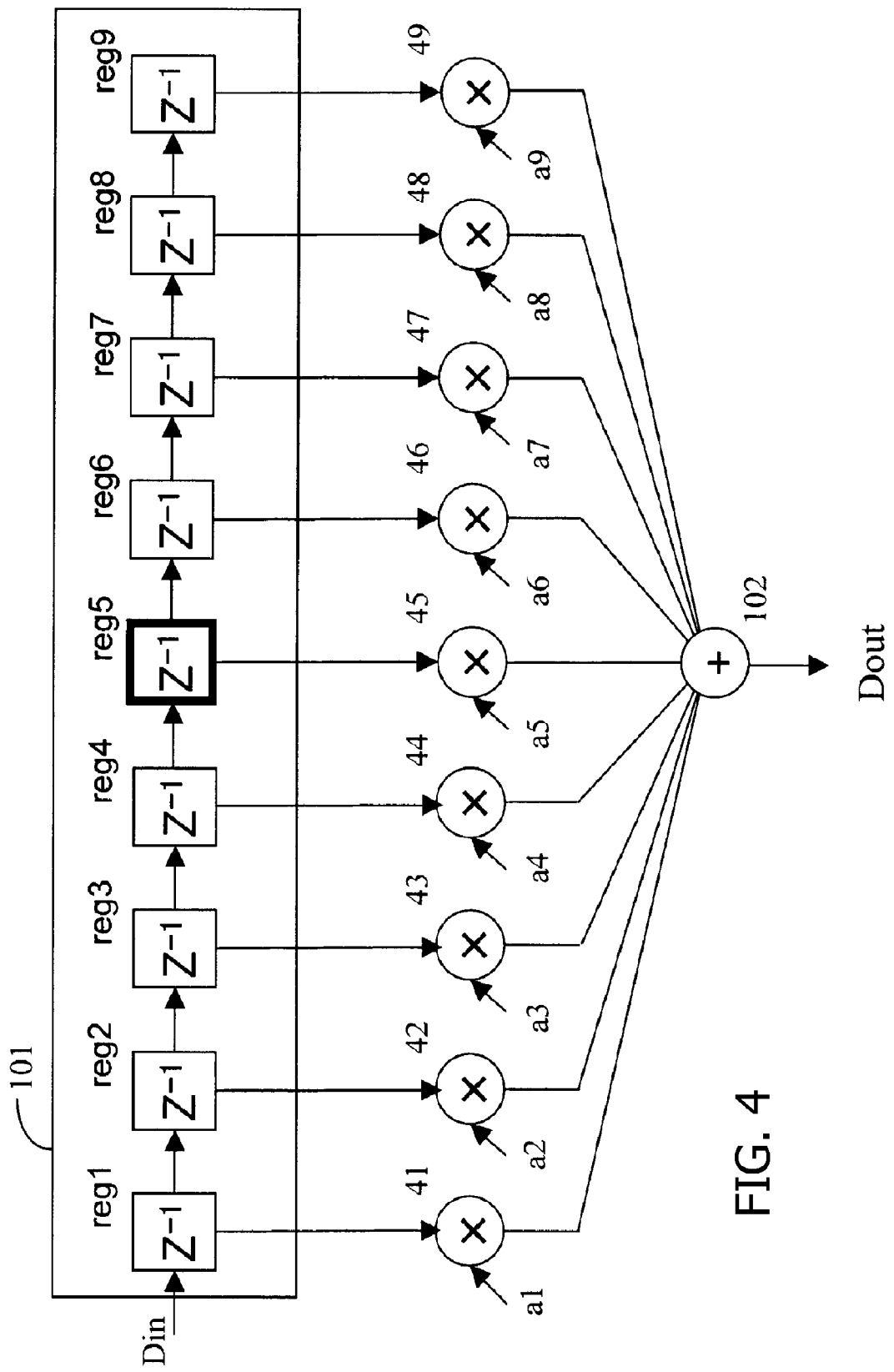
FIG. 4 is a block diagram illustrating an example of a typical convolution filter 22.

FIG. 4 is a block diagram illustrating an example of a typical convolution filter 22. The convolution filter 22 includes for example a shift register with 2N+1 taps, 2N+1 coefficient multipliers, and an adder, where N=4. The convolution filter 22 illustrated in FIG. 4 includes a shift register 101 with nine register stages reg1 to reg9, nine coefficient multipliers 41 to 49, and an adder 102.

The shift register 101 stores input data Din in register stages reg1 to reg9 in sequence in synchronization with a clock pulse, not depicted. For example, data in register stages reg1 and reg2 are shifted to register stages reg2 and reg3 at the next clock pulse, respectively, and new input data Din is stored in register stage reg1. Data stored in register stage reg9 is lost at the next clock pulse.

The coefficient multipliers 41 to 49 are provided with coefficients a1 to a9 corresponding to register stages reg1 to reg9, respectively, and outputs data stored in register stages reg1 to reg9 multiplied by the coefficients a1 to a9, respectively. The coefficients a1 to a9 are values for implementing the function of a filter. The coefficients a1 to a9 are set to certain values such that the convolution filter 22 functions as a low-pass filter. For example, one of the coefficients a1 to a9 that is in the central position is set to the largest value and the coefficients at both ends are set to smaller values. Consequently, the operations remove high-frequency components.

The adder 102 adds the outputs of the coefficient multipliers 41 to 49 together and outputs the sum as output data Dout, which is the result of the convolution operation.

In this way, the convolution filter 22 performs a convolution operation on data stored in register stage reg5 with input data Din stored in the sequence of nine register stages reg1 to reg9, including the data preceding and succeeding the data in reg5. The result corresponds to the output data Dout. In other words, the convolution filter 22 performs a convolution operation on the input data Din stored in register stage reg5 with the data stored in register stages reg1 to reg4 and register stages reg6 to reg9 and outputs the result as output data Dout.

Figure 1:
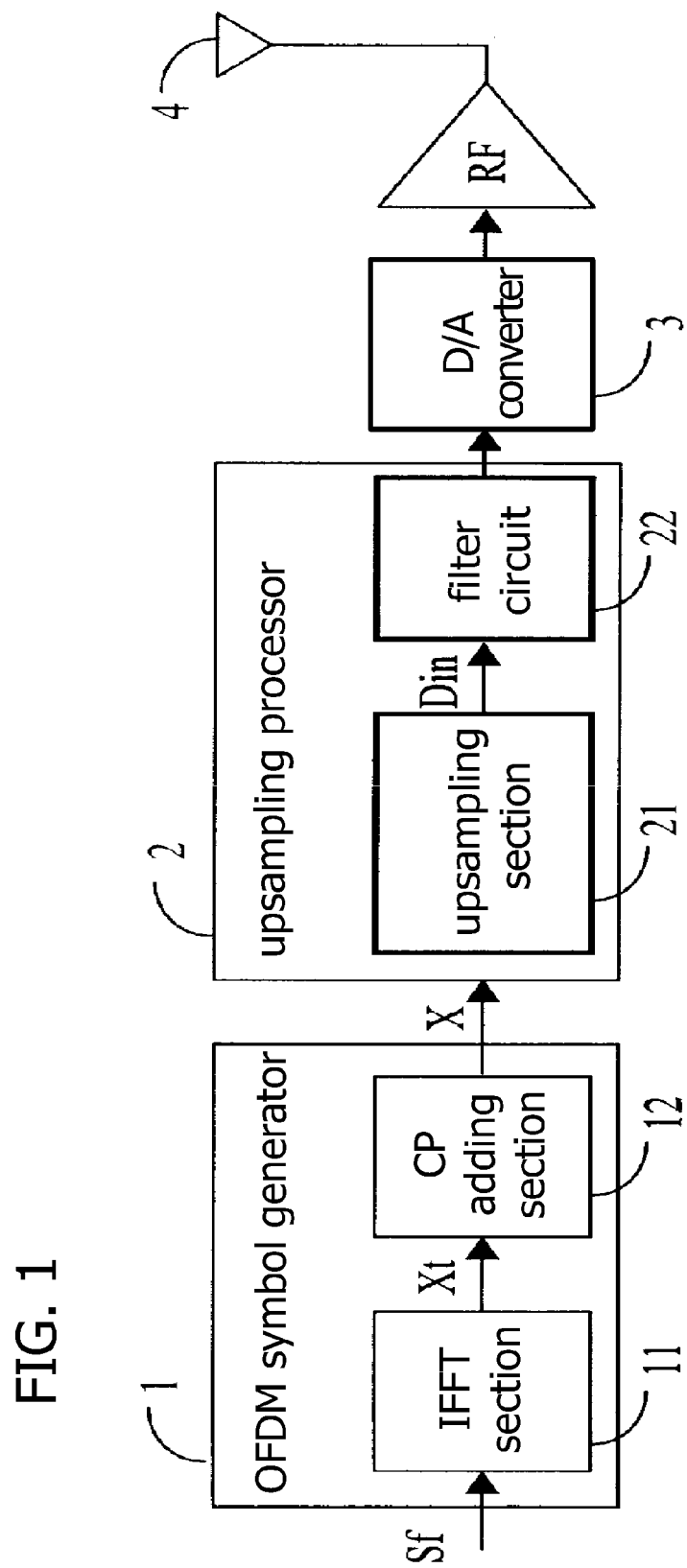

An exemplary operation of the convolution filter 22 will be described. As illustrated in FIG. 1, signal data of an OFDM symbol X in which 0 points have been inserted by the upsampling section 21 is sequentially input in the convolution filter 22 as input data Din.

Figure 5:
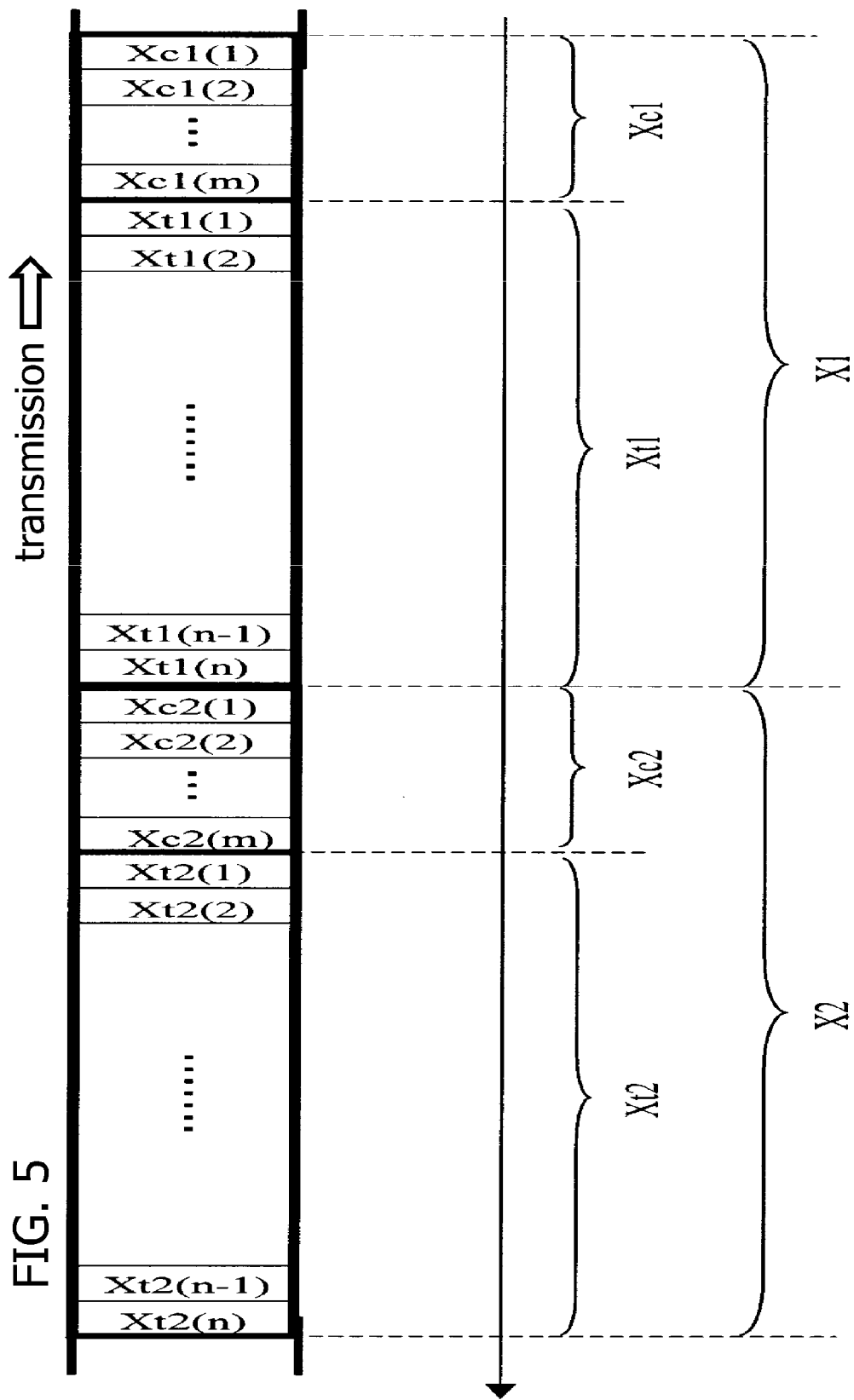
FIG. 5 is a diagram illustrating data strings of OFDM symbols x input in the convolution filter 22.

FIG. 5 illustrates data strings of OFDM symbols X input in the convolution filter 22. The data strings of OFDM symbol X1 in FIG. 5 include the data string of a cyclic prefix Xc1 and the data string of an effective symbol Xt1. It is assumed here that the cyclic prefix Xc1 includes m pieces of data Xc1(1) to Xc1(m) and the effective symbol Xt1 includes n pieces of data Xt1(1) to Xt1(n). The label Xc1(d) of each piece of data represents the dth data from the beginning of the cyclic prefix Xc1. That is, the number "d" in parentheses of the label indicates a sequential number from the beginning of the cyclic prefix. Similarly, the label Xt1(d) represents the dth data from the beginning of the effective data Xt1.

Figure 3A:
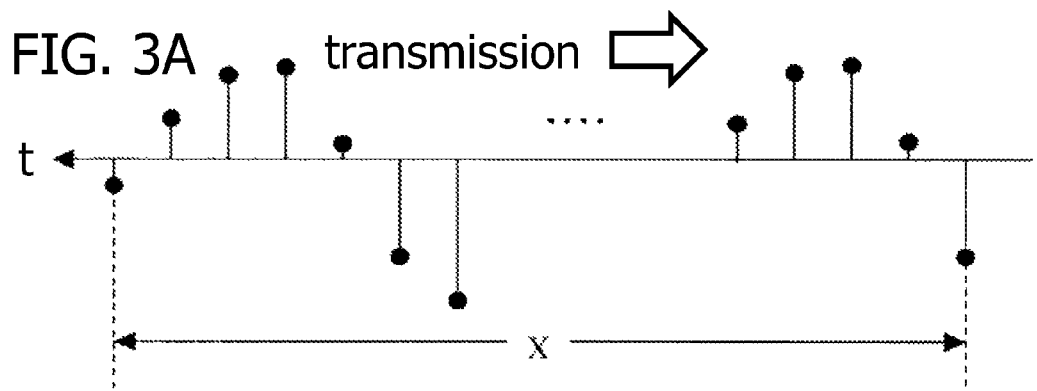
FIGS. 3A to 3D are diagrams illustrating the relationship between signal processing in an upsampling processor 2 and D-A conversion.
Figure 3B:
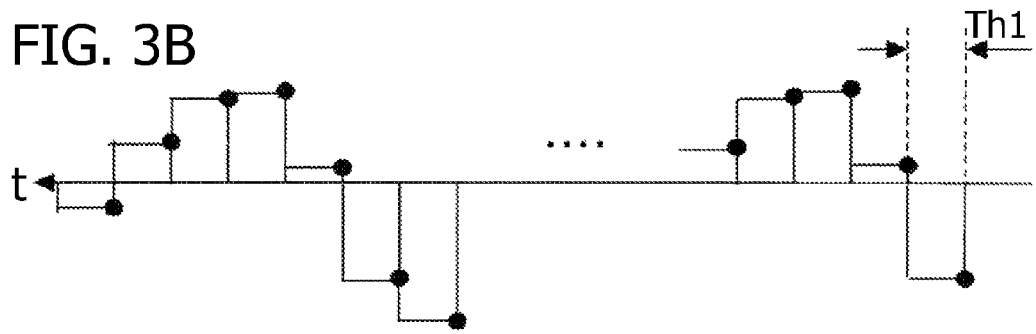
Figure 3C:
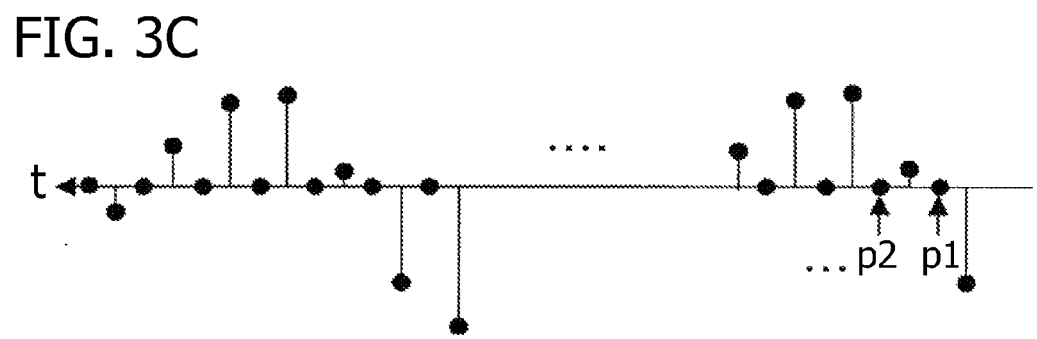

These pieces of data are arranged in chronological order as in the data strings of the OFDM symbol X in which 0 points have been inserted as illustrated in FIG. 3C. Each of the pieces of data is stored in register stage reg1 of the shift register 101 in the convolution filter illustrated in FIG. 4 as input data Din at each certain clock pulse in sequence starting from Xc1(1). The data strings of OFDM symbol X2 are similar to those of OFDM symbol X1 and are stored in the convolution filter 22 in sequence after OFDM symbol X1.

It is assumed in the following description that the upsampling section 21 inserts one 0 point between adjacent sampling points of an input OFDM symbol X as an additional sampling point. That is, the upsampling processor 2 doubles the sampling frequency of the OFDM symbol X.

The result of the 0 point insertion corresponds to the data strings of the OFDM symbol X illustrated in FIG. 3C. In the data strings of OFDM symbol X1 in FIG. 5, cyclic prefix data Xc1(d) is signal data of cyclic prefix Xc1 before insertion of 0 points if d in parentheses which indicates the sequential number from the beginning is an odd number; if d is an even number, the cyclic prefix signal data Xc1($d$) is 0 (a 0 point). In the following description, these data will be referred to as "0 point data" and "signal data" when a distinction between them is to be made as appropriate.

Since the number of sampling points has been doubled, Xc1($m$) is 0 point data and Xc1($m-1$) is the signal data at the tail end of cyclic prefix Xc1 before 0 points are inserted, where "m" is an even number. For example, Xc1(1), Xc1(3), . . . Xc($m-1$) are signal data whereas Xc1(2), Xc1(4), . . . , Xc($m$) are 0 point data.

Similarly, effective symbol data Xt1($d$) is signal data if d in the parentheses is an odd number; if d is an even number, effective symbol data Xt1($d$) is 0 point data. Further, Xc1($n-1$) is signal data at the tail end of effective symbol Xt1, where "n" is an even number.

In this way, signal data and 0 point data alternately appear in the data of OFDM symbol X1 illustrated in FIG. 5 in which 0 points have been inserted.

FIG. 6 illustrates data stored in the shift register 101 in FIG. 4 at each certain clock pulse. Data of OFDM symbols X1, X2, . . . described above and illustrated in FIG. 5 are stored in shift register 101 as input data Din in sequence. Register stages reg1 to reg9 depicted at the top of FIG. 6 correspond to register stages reg1 to reg9, respectively, in FIG. 4. Data stored in register stages reg1 to reg9 in clock cycles CLK=1 to 11 are depicted. As has been described above, a convolution operation is performed on data stored in register stage reg5.

In clock cycle CLK=1, data previously stored in register stages reg1 to reg8 are shifted to register stages reg2 to reg9, respectively, and signal data Xt1($n-1$) at the tail end of OFDM symbol X1 is input in register stage reg1. Then a convolution operation is performed on signal data Xt1($n-5$).

In clock cycle CLK=2, the data are shifted similarly and the 0 point data Xt1($n$) at the tail end of OFDM symbol X1 is input in register stage reg1. Then, a convolution operation is performed on 0 point data Xt1($n-4$).

Figure 3D:
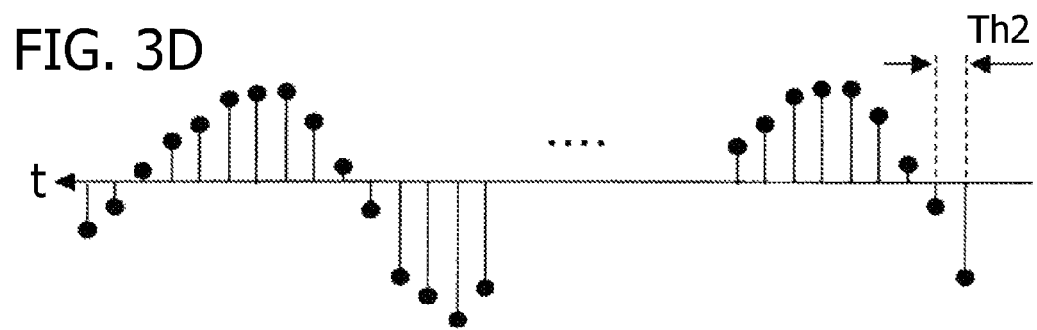

Both of signal data Xt1($n-5$) and 0 point data Xt1($n-4$) on which the convolution operations are performed in clock cycles CLK=1 and 2 are data of OFDM symbol X1 and the data stored in register stages reg1 to reg4 and register stages regio to reg9 are also data of the same OFDM symbol X1. Therefore the convolution operations on both of signal data Xt1($n-5$) and 0 point data Xt1($n-4$) are properly performed and 0 point data Xt1($n-4$) properly interpolates between the data resulting from the convolution operations as illustrated in FIG. 3D.

In clock cycle CLK=3, signal data Xc2(1) at the head of the cyclic prefix Xc2 of OFDM symbol X2 is input and a convolution operation is performed on signal data Xt1($n-3$). Here, although signal data Xt1($n-3$) on which the convolution operation is to be performed is data of OFDM symbol X1, signal data Xt1($n-3$) is convolved with signal data Xc2(1) of OFDM symbol X2 which is different from OFDM symbol X1. That is, data of symbols interfere in the course of the convolution operation in the convolution filter 22 (the interference is hereinafter referred to as intersymbol interference). There is no correlation between signal data of OFDM symbols X1 and X2. Therefore, signal data Xt1($n-3$) has not properly been convolved because of the influence of signal data Xc2(1) and the signal data Xt1($n-3$) convolved does not have continuity with other convolved data of OFDM symbol X.

In clock cycle CLK=4, 0 point data Xc2(2) is input and a convolution operation is performed on 0 point data Xt1($n-2$). As in the operation in clock cycle CLK=3, 0 point data Xt1($n-2$) on which the convolution operation is to be performed is convolved with signal data Xc2(1) and 0 point data Xc2(2) of different OFDM symbol X2. Therefore, the result of the convolution operation on 0 point data Xt1($n-2$) does not properly interpolate between the convoluted data due to the influences of data Xc2(1) and Xc2(2).

In clock cycle CLK=5, signal data Xc2(3) is input and a convolution operation is performed on signal data Xt1($n-1$). Therefore, the convolution operation on signal data Xt1($n-1$) is affected by data Xc2(1), Xc2(2) and Xc2(3) of OFDM symbol X2 stored in register stages reg1 to reg3.

In clock cycle CLK=6, 0 point data Xc2(4) is input and a convolution operation is performed on 0 point data Xt1($n$) at the tail end of OFDM symbol X1. The convolution operation on 0 point data Xt1($n$) is affected by data Xc2(1) to Xc2(4) of OFDM symbol X2 stored in register stages reg1 to reg4.

In clock cycle CLK=7, signal data Xc2(5) is input and a convolution operation is performed on signal data Xc2(1) at the head end of OFDM symbol X2. The convolution operation on signal data Xc2(1) is affected by data Xt1($n$) to Xt1($n-3$) of OFDM symbol X1 stored in register stages regio to reg9.

In clock cycle CLK=8, 0 point data Xc2(6) is input and a convolution operation is performed on 0 point data Xc2(2). The convolution operation on 0 point data Xc2(2) is affected by data Xt1($n$) to Xt1($n-2$) of OFDM symbol X1 stored in register stages reg7 to reg9.

Similarly, in clock cycle CLK=9, a convolution operation on signal point data Xc2(3) is affected by data Xt1($n$) and Xt1($n-1$) of OFDM symbol X1 stored in register stages reg8 and reg9.

In clock cycle CLK=10, intersymbol interference occurs because 0 point data Xt1($n$) of OFDM symbol X1 is stored in register stage reg9.

In clock cycle CLK=11, data stored in register stages reg1 to 9 are data of the same OFDM symbol X2 having the same phase and having continuity with each other. Therefore, signal data Xc2(5) is properly convolved without intersymbol interference.

As has been described, intersymbol interference occurs between data strings Xt1($n-3$) to Xt1($n$) at the tail end of OFDM symbol X1 and data strings Xc2(1) to Xc2(4) at the head end of OFDM symbol X2. Then, OFDM symbol X2 is properly convolved with data of the same symbol in sequence. At the symbol boundary between OFDM symbols X2 and X3, similar intersymbol interference occurs.

Figure 7:
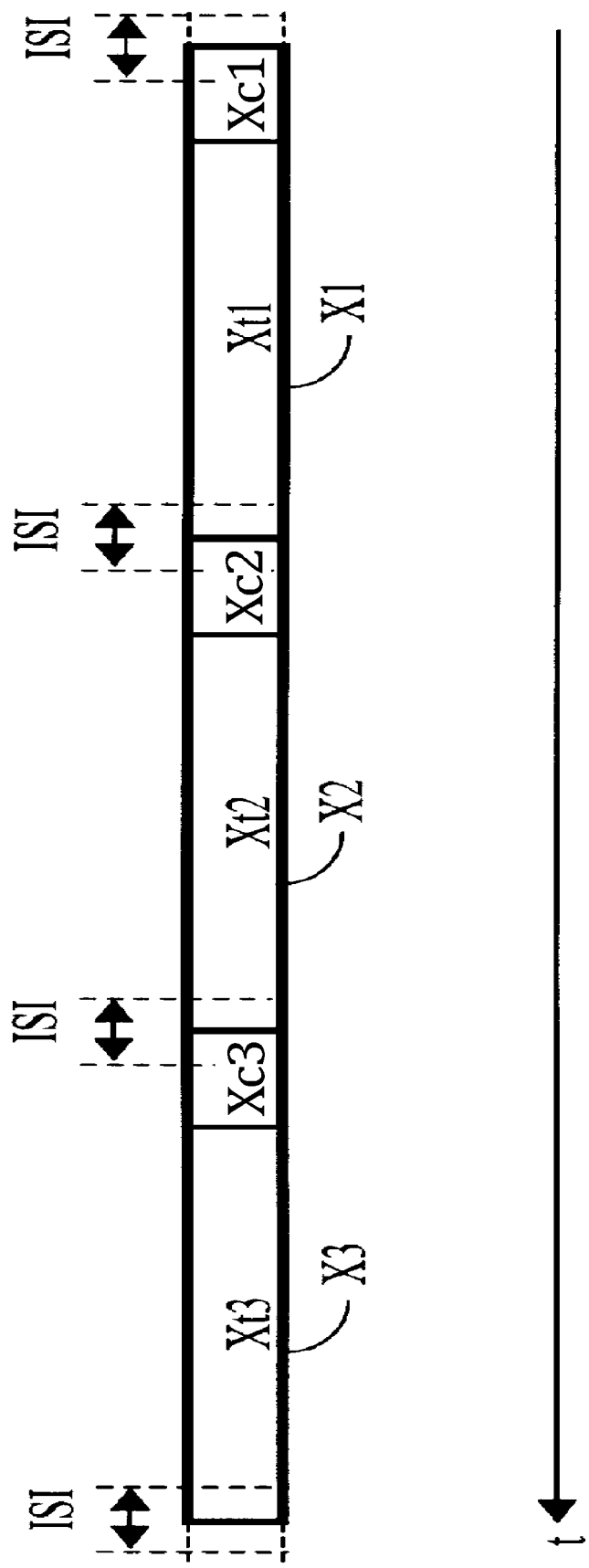
FIG. 7 is a diagram illustrating intersymbol interference ISI.

FIG. 7 illustrates intersymbol interference ISI. Intersymbol interference occurs in convolution operations at each boundaries between OFDM symbols X1, X2, . . . generated in sequence. That is, the waveform of the signal is degraded at boundaries between OFDM symbols as the convolution filter 22 which functions as a low-pass filter performs convolution operations on data strings of OFDM symbols X1, X2, . . . in sequence.

The intersymbol interference occurs in the data string at the tail end of OFDM symbol X1 and the data string at the head end of the OFDM symbol X2 as described above. The data string at the head end of OFDM symbol X2 is included in the cyclic prefix Xp, which is a redundant signal added in order to reduce interference in multipath transmission and is removed at a receiving end. Therefore, the intersymbol interference in the data string at the head end of OFDM symbol X2 does not affect transmission conditions and therefore is acceptable. On the other hand, the intersymbol interference in the data string at the tail end of OFDM symbol X1 is the problem.

Furthermore, a convolution filter needs an adequate number of taps for the convolution filter to achieve a desired filter function. As the number of register stages of the shift register 101 increases, the number of convolution operations to perform with data of different OFDM symbols at symbol boundaries increases and so does the influence of intersymbol interference.

First Embodiment

Figure 8:
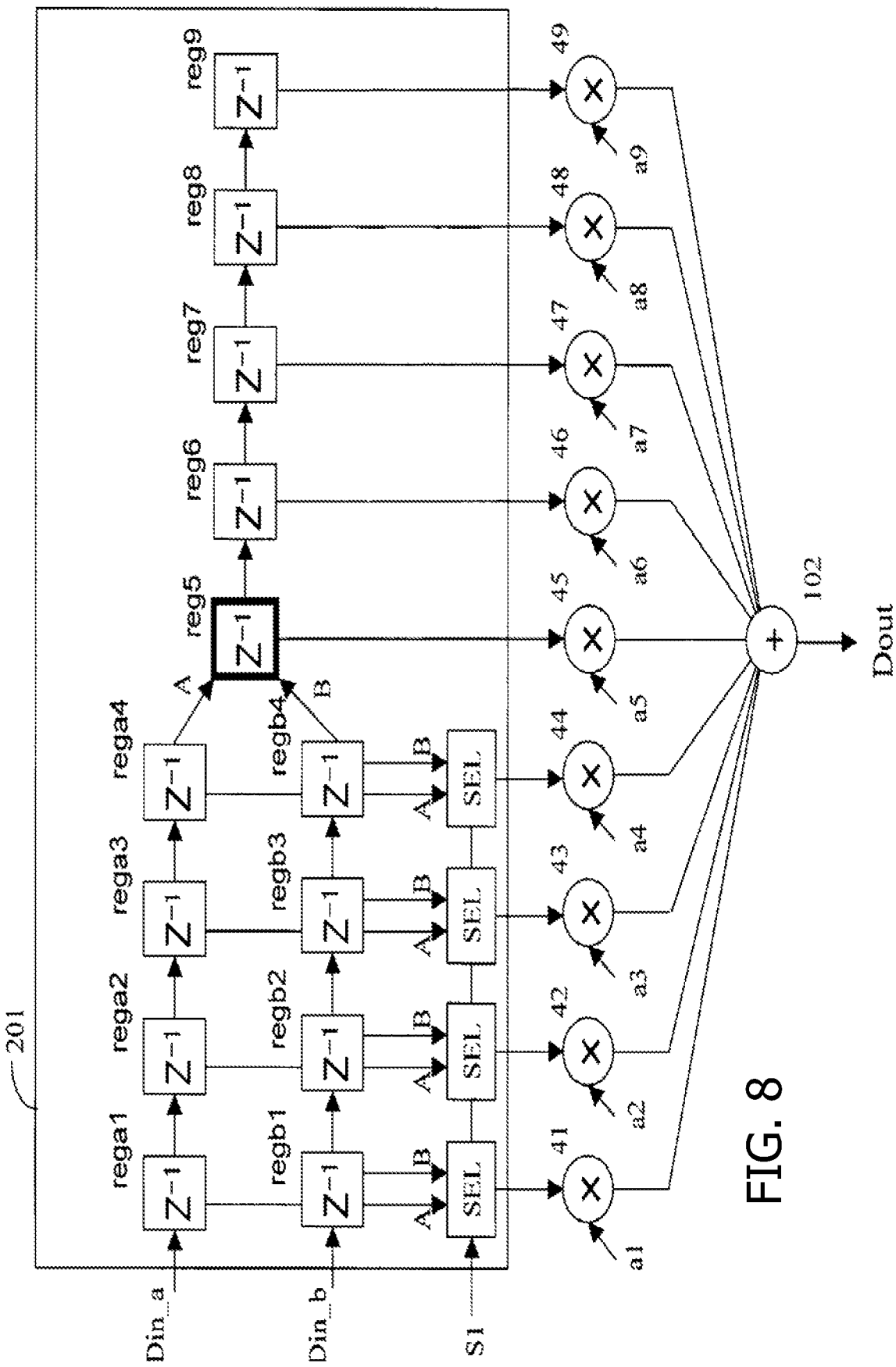
FIG. 8 is a block diagram illustrating a convolution filter 22 in a first embodiment.

FIG. 8 is a block diagram illustrating a convolution filter 22 in a first embodiment. The convolution filter 22 differs from the typical convolution filter 22 illustrated in FIG. 4 in the internal configuration of a shift register 201. The other components are the same or equivalent to those of the convolution filter 22 in FIG. 4 and are given like labels. The first embodiment will be described below, excluding what has been already described.

The shift register 201 includes a set of register stages rega1 to rega4 and another set of register stages regb1 to regb4, which are alternately selected and precede center register stage reg5, a subsequent set of register stages rega6 to rega9, and a set of selectors SEL. The selectors SEL select register stages rega1 to rega4 or regb1 to regb4 according to a selector control signal S1. Coefficient multipliers 41 to 44 multiply data stored in register stages rega1 to rega4 or register stages regb1 to regb4 selected by the selectors SEL by coefficients a1-a4 and outputs the products.

The shift register 201 has two inputs. Input data Din_a are shifted into the set of register stages rega1 to rega4 and input data Din_b are shifted into the set of register stages regb1 to regb4 at each clock pulse. Data stored in register stage rega4 or regb4 selected by the selector SEL according to the selector control signal S1 is stored in register stage rega5. For example, when the selectors SEL select register stages rega1 to rega4, the data stored in register stage rega4 is stored in register stage rega5 at the next clock pulse.

The coefficient multipliers 41 to 49 and the adder 102 in the convolution filter 22 together perform convolution operations on the data stored in the set of register stages rega1 to rega4 or the set of regb1 to regb4 selected by the selectors SEL with the data stored in the set of register stages reg5 to reg9 and output the result of the convolution operation on the data stored in register stage reg5 as output data Dout.

Figure 9:
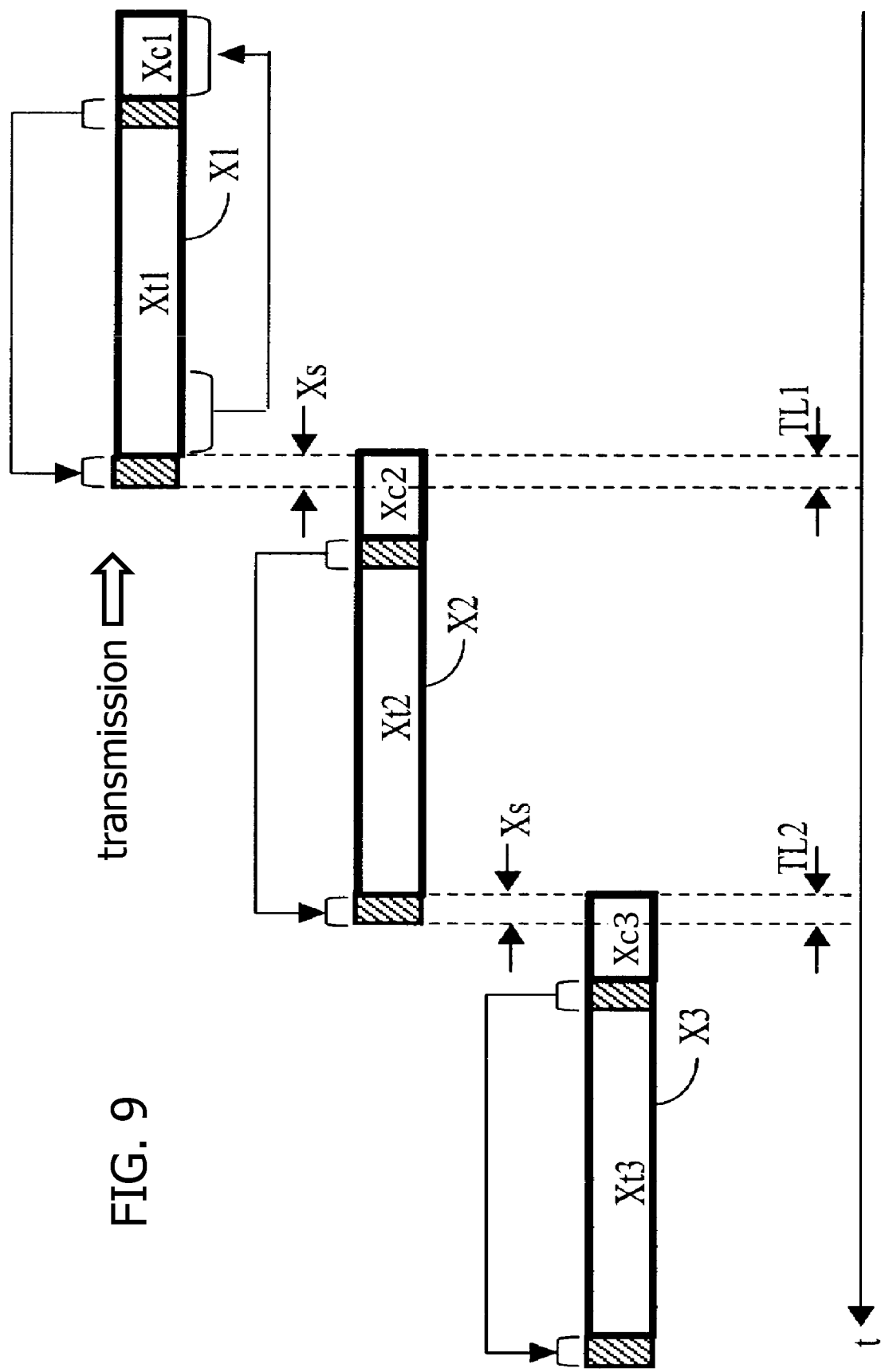
FIG. 9 is a diagram illustrating a procedure of processing performed on an OFDM symbol input in the convolution filter 22 in FIG. 8.

FIG. 9 illustrates a procedure of processing performed on OFDM symbols input in the convolution filter 22 in FIG. 8. The cause of the intersymbol interference in the data string at the tail end of OFDM symbol X1 illustrated in FIG. 6 in the convolution filter 22 in FIG. 4 is that the convolution filter 22 in FIG. 4 performs the convolution operation on data of OFDM symbol X1 with a data string of different OFDM symbol X2 that is input subsequently to the data of OFDM symbol X1. To reduce such interference, the convolution filter 22 of the first embodiment performs a convolution operation on data strings of the same OFDM symbol even at a symbol boundary.

FIG. 9 illustrates OFDM symbols X1, X2, ... sequentially input in the convolution filter 22. After data at the tail end of OFDM symbol X1 is input in the convolution filter 22, the data string at the head end of effective symbol Xt1 of OFDM symbol X1 is sequentially input as extension data Xs1, instead of the data string at the head end of OFDM symbol X2, and then a convolution operation is performed.

Figure 2A:
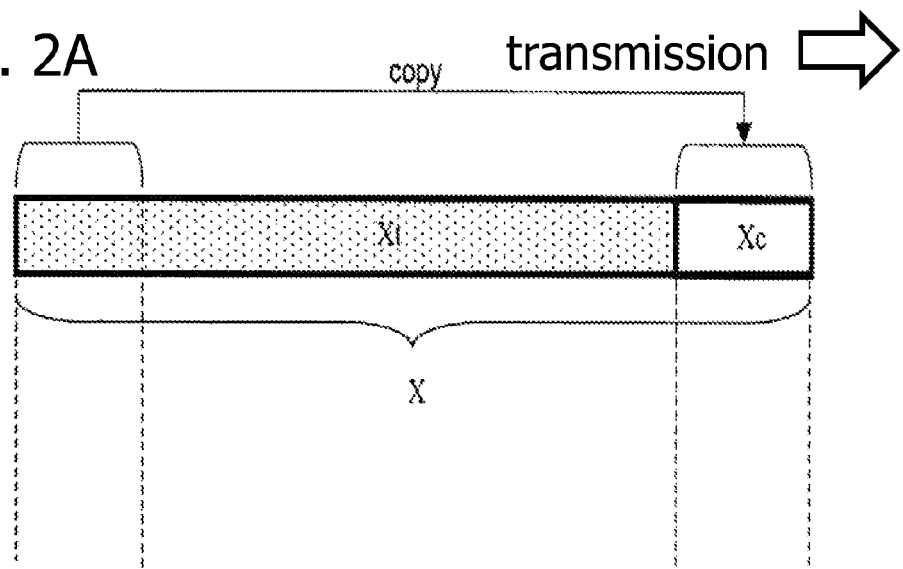
FIGS. 2A, 2B and 2C are diagrams illustrating a signal generated by the processing in FIG. 1 and its data.
Figure 2B:
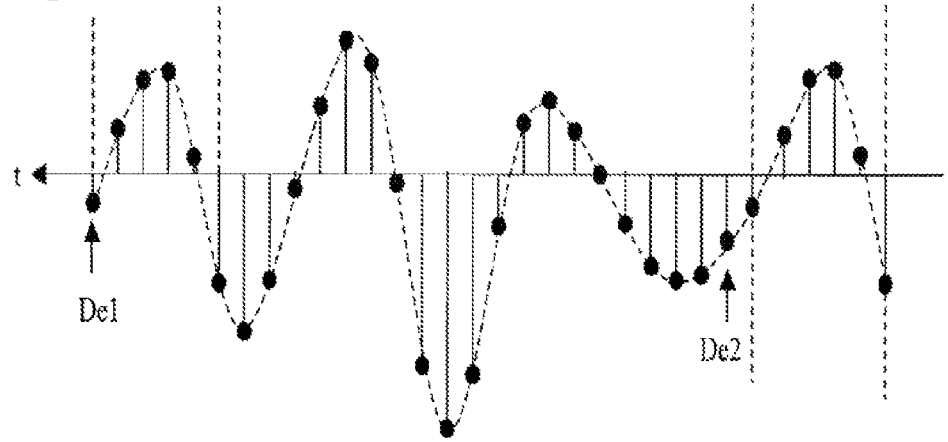
Figure 2C:
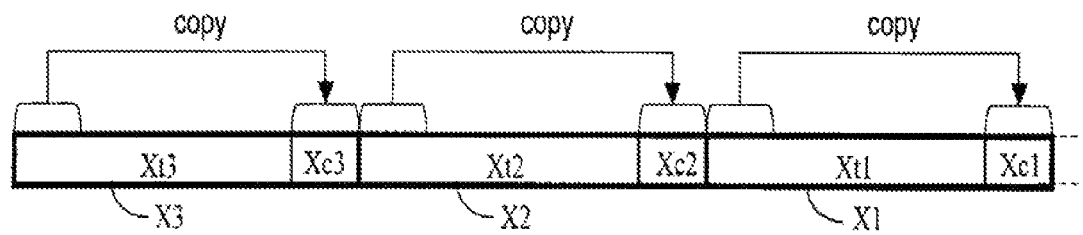

As illustrated in FIG. 2B, signal data De1 and De2 at both ends of effective symbol Xt have the same phase and are in a cyclic relation. Accordingly, extension data Xs1 added to the data string at the tail end of OFDM symbol X1 has continuity with the data string at the tail end. Therefore, intersymbol interference in the data string at the tail end of OFDM symbol X1 may be avoided by performing a convolution operation using extension data Xs1 instead of the data string at the head end of symbol X2 input in the convolution filter 22 in clock period TL1.

Similarly, the data string at the head end of effective symbol Xt2 is input as extension data Xs2 in the convolution filter 22 in the subsequent clock period TL2 at the boundary between OFDM symbols X2 and X3 and a convolution operation is performed using extension data Xs2.

An example of the operation of the convolution filter 22 will be described below.

FIG. 10 illustrates data stored in the shift register 201 in FIG. 8 at each certain clock pulse. The data sequentially input in the shift register 201 are data of OFDM symbols X illustrated in FIG. 5 in which 0 points have been inserted. Register stages rega1 to rega4, regb1 to regb4, and reg5 to reg9 of the shift register 201 depicted at the top of FIG. 10 correspond to register stages rega1 to rega4, regb1 to regb4, and reg5 to reg9 depicted in FIG. 8, respectively. Data stored in the register stages in clock cycles CLK=1 to 11 are depicted. Selector control signal S1 which switches between A and B is also depicted. As has been described, a convolution operation is performed on the data stored in register stage reg5.

In clock cycle CLK=1, data Xt1($n$−1) of OFDM symbol X1 is input in both of register stages rega1 and regb1. A convolution operation on data Xt1($n$−5) is performed on the basis of data stored in the set of register stages regb1 to regb4 or the set of register stages rega5 to rega9 selected by selectors SEL.

In this way, the convolution filter 22 in a normal mode stores the same input data Din_a and Din_b in register stages rega1 and regb1 at the same time. The selectors SEL select the set of register stages regb1 to regb4 according to the selector control signal S1. Data are input at the timings illustrated in FIG. 6. For example, data Xt1($n$−1) is input in clock cycle CLK=1.

In clock cycle CLK=2, data Xt1($n$) at the tail end of OFDM symbol X1 is input in register stages rega1 and regb1. Then, a convolution operation is performed on data Xt1($n$−4).

Here, the results of the convolution operations in clock cycles CLK=1 and 2 are the same as the results of the convolution operations in the convolution filter 22 in FIG. 4 in clock cycles CLK=1 and 2 in FIG. 6. Accordingly, the data of the same OFDM symbol X1 which have continuity are convolved. Therefore, intersymbol interference does not occur.

In clock cycle CLK=3, data Xc2(1) at the head of cyclic prefix Xc2 of OFDM symbol X2 is input in register stage regb1 and at the same time data Xt1(1) of an effective symbol which have been copied previously is input in register stage rega1 as extension data Xs. The selector control signal S1 changes and the selectors SEL select register stages rega1 to rega4. Then, a convolution operation is performed on data Xt1($n$−3) on the basis of the data stored in register stages rega1 to rega4 and register stages reg5 to reg9.

Here, clock cycle CLK=3 corresponds to the first clock pulse of clock period TL1 in FIG. 9. As has been stated, extension data Xs1 has the same phase as the data string at the tail end of OFDM symbol X1 and has continuity with that data string. Therefore intersymbol interference does not occur in the convolution operation on data Xt1($n$−3).

Similarly, in clock cycles CLK=4 to 6, extension data Xs1 is input in register stage rega1 in sequence and the first data string of cyclic prefix Xc2 of OFDM symbol X2 is input in register stage regb1 in sequence. In the clock periods, the selectors SEL have selected register stages rega1 to rega4 and convolution operations are performed on the basis of the data stored in register stages rega1 to rega4 and register stages reg5 to reg9. Since data Xt1($n$−2), Xt1($n$−1) and Xt1($n$) on which the convolution operation is to be performed in the clock cycles CLK are convolved with extension data Xs of the same OFDM symbol with the phase having continuity, intersymbol interference does not occur in the convolution operations. The clock cycles CLK=3 to 6 correspond to clock period TL1 in FIG. 9.

In clock cycle CLK 7, the convolution filter 22 returns to the state of operation in clock cycles CLK 1 and 2. For example, the convolution filter 22 stores the same input data Din_a and Din_b in register stages rega1 and regb1 at the same time. The selectors SEL select register stages regb1 to regb4.

In clock cycle CLK=7, data Xc2(5) of cyclic prefix Xc2 of OFDM symbol X2 is input in register stages rega1 and regb1. Then, a convolution operation is performed on data Xc2(1) on the basis of the data stored in the set of register stages regb1 to regb4 and the set of register stages reg5 to reg9. Here, intersymbol interference occurs because data Xc2(1) is convolved with the data of different OFDM symbol X1 stored in register stages regio to reg9.

Similarly, in clock cycles CLK=7 to 10, intersymbol interference occurs. Here, the results of convolution operations at clock cycles CLK=7 to 10 are the same as the results of the convolution operations in the convolution filter 22 in FIG. 4 at the corresponding clock cycles in FIG. 6.

In clock cycle CLK=11, data stored in register stages reg1 to reg9 are data of the same OFDM symbol X2 having the same phase and continuity. Accordingly, data Xc2(5) is properly convolved without intersymbol interference.

Figure 11:
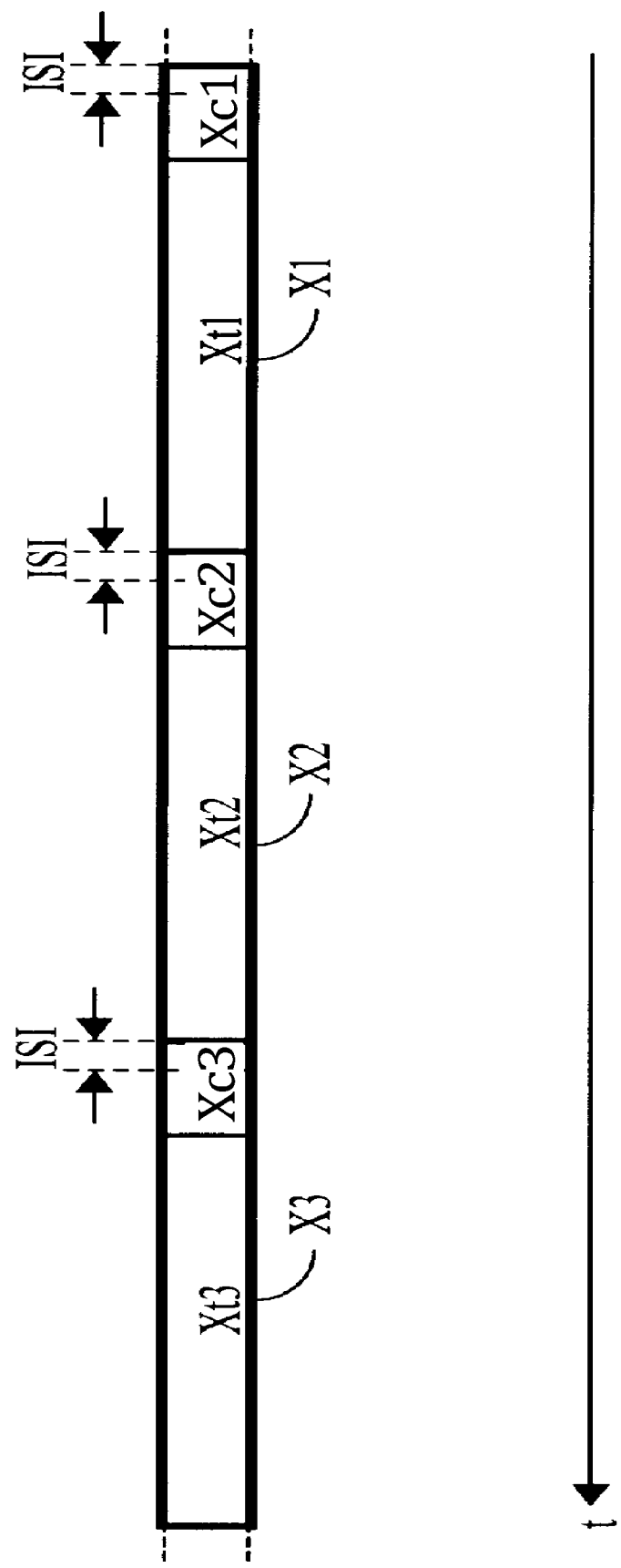
FIG. 11 is a diagram illustrating intersymbol interference ISI that occurs when the convolution filter 22 in the first embodiment is used.

FIG. 11 illustrates intersymbol interference ISI when the convolution filter 22 of the first embodiment is used. Comparison with the intersymbol interference ISI illustrated in FIG. 7 clearly indicates the difference: intersymbol interference occurs inside each cyclic prefix Xc which is the head end data string of each of OFDM symbols X1, X2, ... generated in sequence. Since the cyclic prefix Xc is removed at the receiving end as has been described, intersymbol interference in the cyclic prefix data Xc does not affects transmission conditions.

As has been described, after the data at the tail end of OFDM symbol X1 has been input in the convolution filter 22 in the first embodiment, extension data Xs1 copied previously is input along with the data string at the head end of OFDM symbol X2. The extension data Xs1 is the data string at the head end of the effective symbol Xt of OFDM symbol X1 and therefore has the same phase as and continuity with the data string at the tail end of OFDM symbol X1. Since the convolution filter 22 performs a convolution operation on the basis of the extension data Xs1 in clock period TL1 instead of the data string at the head end of symbol X2, intersymbol interference in the data string at the tail end of OFDM symbol X1 may be avoided.

Second Embodiment

Figure 12:
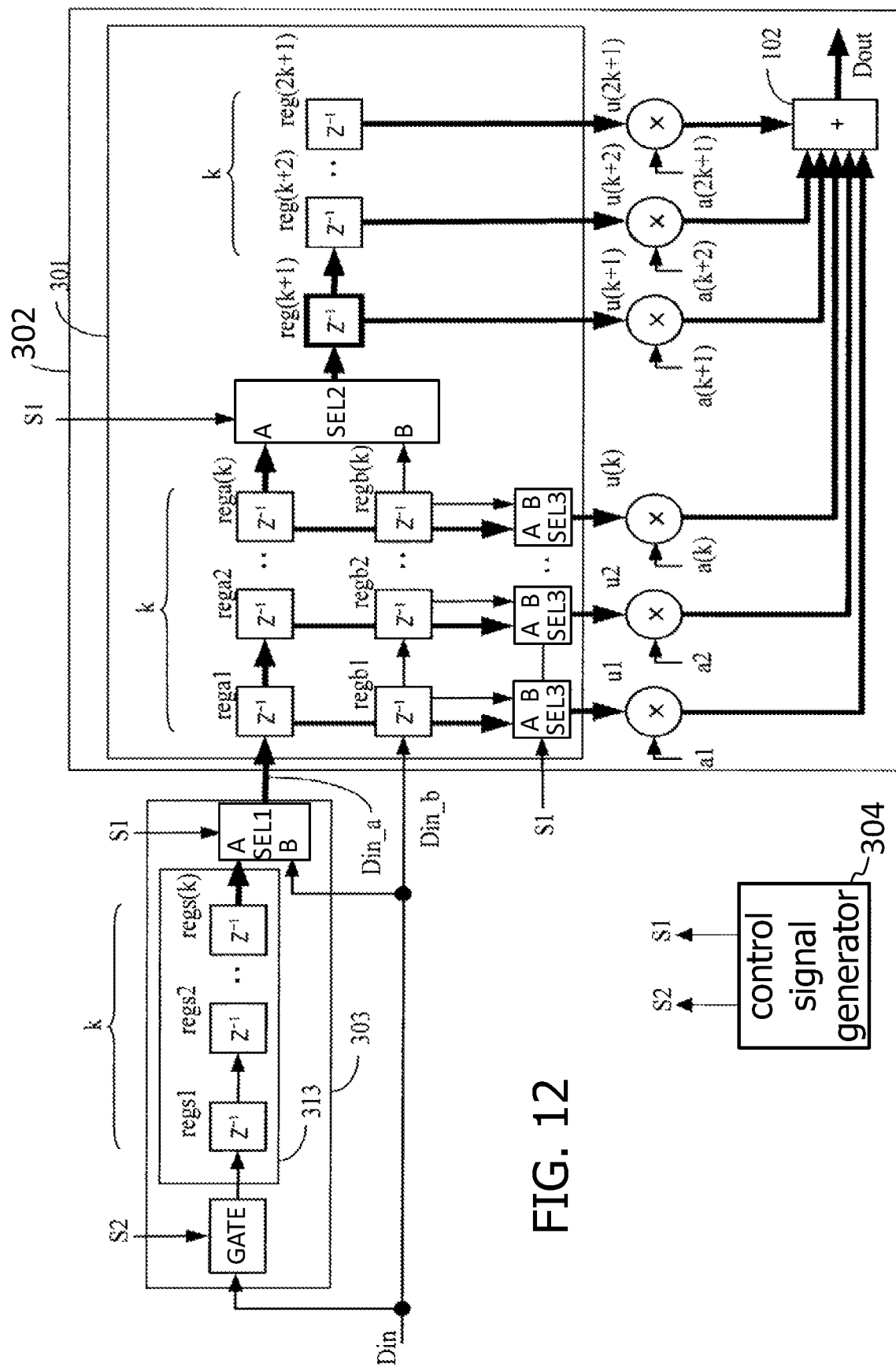
FIG. 12 is a block diagram illustrating a convolution filter 22 in a second embodiment.

FIG. 12 is a block diagram illustrating a convolution filter 22 in a second embodiment. The convolution filter 22 differ from the convolution filter 22 in the first embodiment illustrated in FIG. 8 in that a generalized number 2k+1 of taps (register stages) are provided in the convolution filter 22 in FIG. 12 and that the convolution filter 22 has an arrangement for inputting extension data Xs.

A basic configuration and operation of the convolution filter 22 illustrate in FIG. 12 will be described first. Data strings of symbols X to be convolved are input in sequence as input data Din. Normally, input data Din are shifted into a set of register stages rega1 to rega(k) and a set of register stages regb1 to regb(k) as input data Din_a and Din_b, respectively. Then the data stored in the set of register stages regb1 to regb(k) and the set of register stages reg(K+1) to reg(2k+1) are multiplied at multipliers u1 to u(2k+1) by coefficients a1 to a(2k+1), the products are added together at an adder 102 and the result of the convolution operation is output as output data Dout.

When input data Din is extension data Xs, a gate circuit GATE opens and the extension data Xs is also shifted into register stages regs1 to regs(k) of a shift register 313 and temporarily held there. After the data string at the tail end of the OFDM symbol is input as input data Din, the extension data Xs stored in the shift register 313 are shifted into register stages rega1 to rega(k) in sequence. Concurrently with the input, the data string at the head of the next OFDM symbol is shifted into register stages regb1 to regb(k) as input data Din_b. In this case, the data stored in register stages rega1 to rega(k) and register stages reg(k+1) to reg(2k+1) are convolved.

After all extension data in register stages regs1 to regs(k) are input in register stages rega1 to rega(k), the convolution filter 22 returns to the normal operation state described above and the data stored in register stages regb1 to regb(k) and register stages reg(k+1) to reg(2k+1) are convolved.

A configuration of the convolution filter 22 illustrated in FIG. 12 will be described below.

The convolution filer 22 includes a convolution operation section 302 and an extension data storage section 303.

The convolution operation section 302 includes a shift register 301, 2k+1 coefficient multipliers u1 to u(2k+1), and an adder 102. The shift register 301 includes a set of k register stages rega1 to rega(k) and a set of k register stages regb1 to regb(k) which precede center register stage reg5, and a subsequent set of k register stages reg(k+2) to reg(2k+1), and selectors SEL2 and SEL3.

When an input selector control signal S1 indicates "A", the selectors SEL3 select register stages rega1 to rega(k); when the input selector control signal S1 indicates "B", the selectors SEL3 select register stages regb1 to regb(k).

The coefficient multipliers u1 to u(k) multiply data stored in register stages rega1 to rega(k) or register stages regb1 to regb(k), whichever is selected by the selector SEL3, by certain coefficients a1 to a(k), respectively, and outputs the resulting values. Input data Din_a is shifted into register stages rega1 to rega(k) and input data Din_b is shifted into register stages regb1 to regb(k) at each clock pulse.

When the input selector control signal S1 indicates "A", the selector SEL2 selects the set of register stages rega1 to rega(k); when the input selector control signal S1 indicates "B", the selector SEL2 selects the set of register stages regb1 to regb(k). The data stored in register stages rega(k) and regb(k) selected by the selector SEL2 is input in register stage reg(k+1) at a clock pulse.

The convolution filter 22 performs a convolution operation on the basis of the data stored in register stages rega1 to rega(k) or register stages regb1 to regb(k) selected by the selectors SEL3 and k+1 pieces of data stored in register stages reg(k+1) to reg(2k+1) in the same way as in the convolution filter 22 in FIG. 4. Then the result of a convolution operation performed on the data stored in register stage reg(k+1) in the center is output as output data Dout.

From foregoing descriptions, the convolution operation section 302 has a configuration in which the number of taps (register stages) of the convolution filter 22 of the first embodiment in FIG. 8 is generalized as 2k+1 taps (register stages). The selector SEL2 is not depicted in FIG. 8 illustrating the convolution filter 22 of the first embodiment.

The extension data storage section 303 includes a shift register 313, a selector SEL1 and a gate circuit GATE. The shift register 313 includes a set of k register stages regs1 to regs(k) in which extension data Xs are stored. The selector SEL1 selects data Din_a to be sequentially input in register stage rega1 according to a selector control signal S1. For example, when the selector control signal S1 indicates "A", the selector SEL1 selects extension data Xs stored in register stage regs(k) as input data Din_a; when the selector control signal S1 indicates "B", the selector SEL1 selects input data Din as input data Din_a. The gate circuit GATE controls input of input data Din into the shift register 313 according to an extension data input control signal S2. For example, when the extension data input control signal S2 indicates "NoGate", input data Din is input into register stage regs1; when the extension data input control signal S2 indicates "Gate", input data Din is not input.

The number of register stages regs1 to regs(k) is equal to the number of register stages rega1 to rega(k). As has been described, when the data string at the tail end of an OFDM symbol is input in the convolution operation section 302 and a convolution operation is performed, extension data Xs stored in register stages regs1 to regs(k) are input into register stages rega1 to rega(k) in sequence. Accordingly, when the data at the tail end of an OFDM symbol is stored in register stage reg(k+1) and a convolution operation is performed, extension data Xs is stored in each of the k register stages rega1 to rega(k). Therefore, at least k register stages regs1 to regs(k) are requested for storing k pieces of extension data Xs.

A control signal generator 304 generates the selector control signal S1 and the extension data input control signal S2 described above. The control signal generator 304 includes a timing counter, not depicted, and holds information such as the number of pieces of OFDM symbol signal data and data configuration. The control signal generator 304 uses the timing counter and these items of information to count data input into the convolution operation section 302, for example, and changes the signals S1 and S2 at proper timing.

An example of operation of the convolution filter 22 in the second embodiment will be described below.

Figure 13:
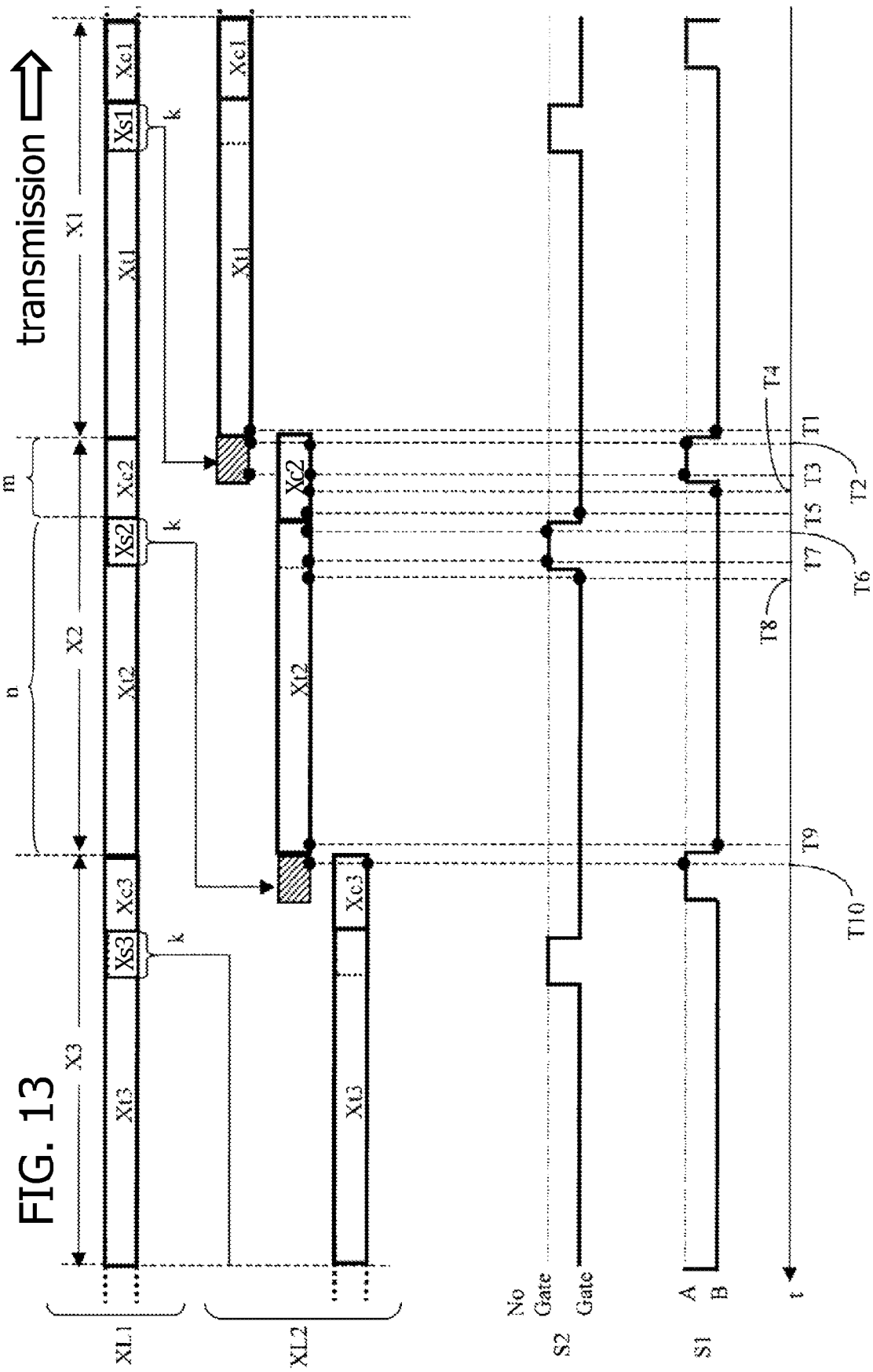
FIG. 13 is a timing chart illustrating a process of processing performed on input OFDM symbols.

FIG. 13 is a timing chart illustrating a process of processing performed on input OFDM symbols. Data strings of OFDM symbols X1, X2, . . . that are sequentially transmitted are illustrated in row XL1. Data strings of OFDM symbols X1, X2, . . . that are sequentially input in the convolution operation section 302 as input data Din are illustrated in row XL2. For example, k pieces of data at the head end of effective symbol Xt1 of OFDM symbol X1 are stored as extension data Xs1. The extension data Xs1 is input in the convolution operation section 302 together with data at the head end of the next OFDM symbol X2. FIG. 13 also illustrates the selector control signal S1 and the extension data input control signal S2 generated by the control signal generator 304.

Figure 14:
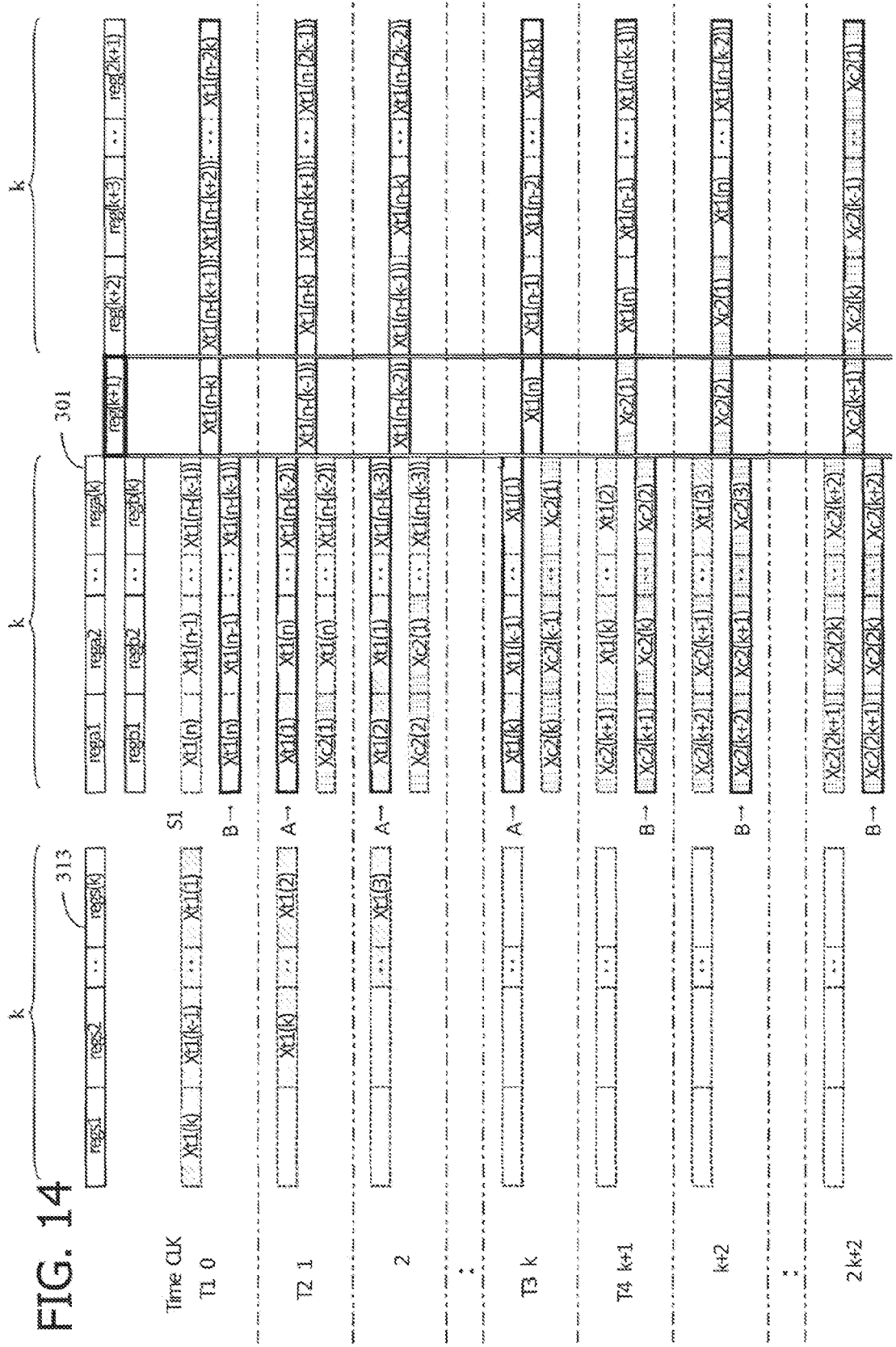
FIG. 14 is a diagram illustrating data stored in shift registers 301 and 313 in FIG. 12 at each clock pulse.
Figure 15:
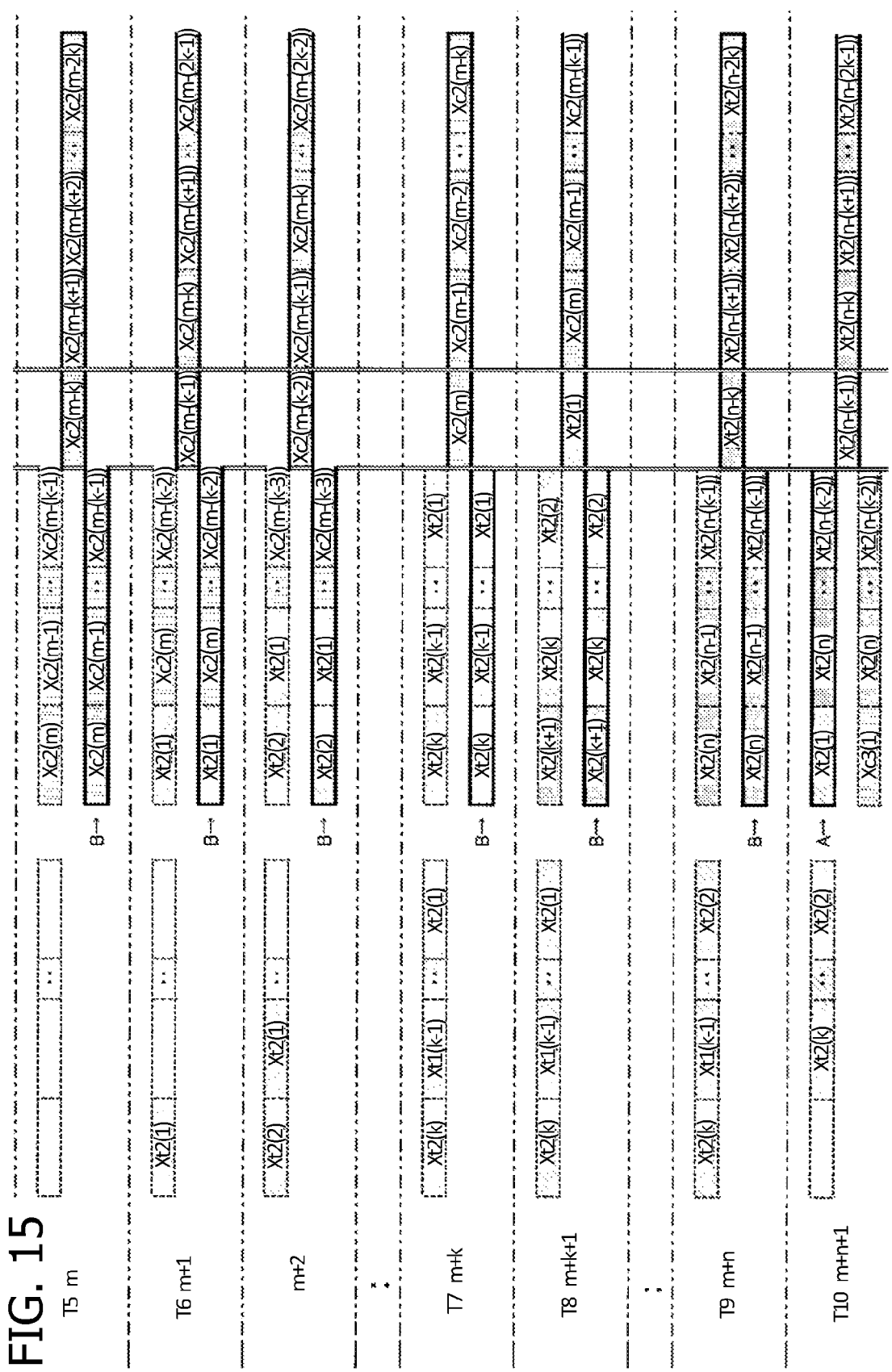
FIG. 15 is a diagram continued from FIG. 14, illustrating data stored in the shift registers 301 and 313 in FIG. 12 at each clock pulse.

FIG. 14 illustrates data stored in the shift registers 301 and 313 in FIG. 12 at each clock pulse. FIG. 15 is a diagram continued from FIG. 14, illustrating data stored in the shift registers 301 and 313 at each clock pulse. It is assumed here that input data Din input in the shift register 301 in sequence are OFDM symbols X, each including m cyclic prefixes Xc and n effective symbols Xt.

The k register stages rega1 to rega(k) and k register stages regb1 to regb(k) of the shift register 301 and the k+1 register stages reg(k+1) to reg(2k+1) depicted at the top of FIG. 14 correspond respectively to the registers in FIG. 12. The k register stages regs1 to regs(k) of the shift register 313 correspond to the registers of the extension data storage section 303 in FIG. 12.

FIG. 14 also illustrates data stored in the registers at times T1 to T10 illustrated in FIG. 13 and the corresponding clock cycles. FIG. 14 further illustrates the control signal S1 which switches between A and B.

Referring to FIGS. 12 through 15, an operation of the convolution filter 22 of the second embodiment at time periods T1 to T10 will be described below.

In time period T1 in FIGS. 13 and 14, data Xt1(n) at the tail end of OFDM symbol X1 is input into the convolution filter 22 as input data Din. The selector control signal S1 indicates "B" and the selectors SEL2 and SEL3 in the convolution filter circuit 22 in FIG. 12 select register stages regb1 to regb(k) and the selector SEL1 selects the input data Din. The state of the convolution filter 22 in which the selector control signal S1 is "B" is hereinafter referred to as "mode B".

Thus, data Xt1(n) is input in both of register stages rega1 and regb1 as input data Din (Din_a and Din_b) in time period T1 (clock cycle CLK=0) in FIG. 14. A convolution operation is performed on data Xt1(n−k) on the basis of the data stored in register stages regb1 to regb(k) selected by the selectors SEL3 and the data stored in register stages reg(k+1) to reg(2k+1). In time period T1, data Xt1(1) to Xt1(k) which are extension data Xs1 have already been stored in register stages regs1 to regs(k).

In time period T2 (clock cycle CLK=1) in FIGS. 13 and 14, data Xc2(1) at the head end of the OFDM symbol X2 is input into the convolution filter 22. The selector control signal S1 changes to "A" and the selectors SEL2 and SEL3 in the convolution filter circuit 22 in FIG. 12 select register stages rega1 to rega(k) and the selector SEL1 selects extension data Xs1 stored in register stage regs(k). The state of the convolution filter 22 in which the selector control signal S1 is "A" is hereinafter referred to as "mode A".

Thus, in time period T2 (clock cycle CLK=1) in FIG. 14, data Xt(1), which is the extension data Xs1 stored in register stage regs(k), is stored in register stage rega1 and data Xc2(1), which is the input data Din, is input in register stage regb1. Data Xt1(n−(k−1)) stored in register stage rega(k) is input in register stage reg(k+1). Then, a convolution operation is performed on data Xt1(n−(k−1)) on the basis of the data stored in register stages rega1 to rega(k) selected by the selectors SEL3 and the data stored in register stages reg(k+1) to reg(2k+1). Extension data Xt1(2) to Xt1(k) are shifted into register stages regs(k) to regs2 in time period T2. On the other hand, the extension data input control signal S2 indicates "Gate" and therefore data Xc2(1) at the head end of OFDM symbol X2, which is input data Din, is not stored in register stage regs1.

As illustrated in FIG. 14, in the period from the next clock cycle CLK=2 to time period T3 (clock cycle CLK=k), convolution operation processing is performed in mode A. For example, extension data Xs1 in the shift register 313 is input into register stage rega1, data in register stages rega1 to rega (k) are input into register stages reg(k+1) to reg(2k+1), OFDM symbol Xc2, which is input data Din, is input into register stage regb1 in sequence. A convolution operation is performed on the data stored in register stage reg(k+1) in sequence.

In time period T3 (clock cycle CLK=k) in FIGS. 13 and 14, data Xt1(k), which is the last extension data Xs1 of OFDM symbol X1 is input into the convolution operation section 302. Thus, extension data Xt1(k) is input into register stage rega1 and input data Xc2(k) is input into register stage regb1 in time period T3 (clock cycle CLK=k) in FIG. 14. Here, all of the data stored in register stages rega1 to rega(k) are extension data Xs1. The data are used to perform a convolution operation on data Xt1(n) at the tail end of OFDM symbol X1 stored in register stage reg(k+1).

In this way, the convolution operation is performed by using extension data Xs1 which is cyclically added to the data string at the tail end of OFDM symbol X1. The extension data Xs1 has the same phase as the data string at the tail end of OFDM symbol X1 and has continuity with the data string. Accordingly, intersymbol interference does not occur in the convolution operation performed on the data string at the tail end of OFDM symbol X1 in the period from T2 to T3.

In time period T4 (clock cycle CLK=k+1) in FIGS. 13 and 14, the convolution filter 22 switches to mode B. Accordingly, data Xc2($k$+1) is input into both of register stages rega1 and regb1 as input data Din (Din_a and Din_b) in time period T4 (clock cycle CLK=k+1) in FIG. 14. Then, a convolution operation is performed on data Xc2(1) at the head end of OFDM symbol X2. Here, intersymbol interference occurs because data Xc2(1) is convolved with data stored in register stages reg(k+2) to reg(2k+1) which are data of different OFDM symbol X1. However, data Xc2(1) is cyclic prefix Xc2 which will be removed at the receiving end as stated above and therefore the intersymbol interference is acceptable.

As illustrated in FIG. 14, the convolution filter 22 continues operating in mode B in the next clock cycle CLK=k+2 and subsequent clock cycles and cyclic prefixes Xc2 are input into both of register stages rega1 and regb1 in sequence. A convolution operation is performed on the data stored in register stage reg(k+1). Since data of OFDM symbol X1 is contained in register stages reg(k+2) to reg(2k+1) in the period until clock cycle CLK=2k, intersymbol interference occurs.

In clock cycle CLK=2k+1 in FIG. 14, data Xc2(1) at the head end of OFDM symbol X2 is stored into register stage reg(2k+1). Data Xc2($k$+1) stored in register stage reg(k+1) is convolved with the data stored in register stages regb1 to regb(k) and the data stored in register stages reg(k+2) to reg(2k+1) which are data of the same OFDM symbol X2. Accordingly, data Xc2($k$+1) does not cause intersymbol interference. Similarly, intersymbol interference does not occur in the subsequent convolution operations on data of OFDM symbol X2.

As has been described above, intersymbol interference occurs in k data strings at the head end of cyclic prefixes Xc2 of OFDM symbol X2 at the boundary between OFDM symbols X1 and X2. However, the cyclic prefixes Xp are redundant signals which will be removed at the receiving end as stated above. Therefore the intersymbol interference does not affect transmission conditions and is acceptable.

Storage of extension data Xc into shift register 313 of the extension data storage section 303 will be described below.

In time period T5 (clock cycle CLK=m) in FIGS. 13 and 15, data Xc2($m$) at the tail end of cyclic prefix Xc2 of OFDM symbol X2 is input into the convolution filter 22. Accordingly, cyclic prefix Xc2($m$) is input into both of register stages rega1 and regb1 in time period T5 (clock cycle CLK=m).

In time period T6 (clock cycle CLK=m+1) in FIGS. 13 and 15, data Xt2(1) at the tail end of effective symbol Xt2 of OFDM symbol X2 is input into the convolution filter 22. Here, the extension data input control signal S2 changes to "NoGate". Accordingly, extension data Xt2(1), which is input data Din, is stored in register stage regs1 in time period T6 (clock cycle CLK=m+1) in FIG. 15. Since the convolution filter 22 is operating in mode B, extension data Xt2(1) is also stored in register stages rega1 and regb1.

Similarly, effective symbols Xt2 are sequentially shifted into register stages regs1, rega1 and regb1 in the period from the next clock CLK=m+2 to time period T7 (clock cycle CLK=m+k) as illustrated in FIG. 15.

In time period T7 (clock cycle CLK=m+k) in FIGS. 13 and 15, effective symbol Xt2($k$) of OFDM symbol X2 is input into the convolution filter 22. Thus, k data strings used as extension data Xc2 in convolution operations at the symbol boundary of OFDM symbol X2 are stored in the shift register 313 as illustrated in time period T7 (clock cycle CLK=m+k) in FIG. 15. That is, the convolution filter 22 has completed storing extension data Xc2.

In time period T8 (clock cycle CLK=m+k+1) in FIGS. 13 and 15, the extension data input control signal S2 changes to "Gate". Accordingly, effective symbol Xt2($k$+1) of OFDM symbol X2 is not stored in register stage regs1 of the shift register 313 but instead stored in register stages rega1 and regb1 as illustrated in time period T8 (clock cycle CLK=m+k+1) in FIG. 15.

Then, since the convolution filter 22 is still operating in mode B, data of OFDM symbol X2 are shifted into register stages rega1 and regb1 until time period T9 in FIG. 13.

In time period T9 (clock cycle CLK=m+n) in FIGS. 13 and 15, data Xt2($n$) at the tail end of OFDM symbol X2 is input into the convolution filter 22. In time period T10 (clock cycle CLK=m+n+1), data Xc3(1) at the head end of OFDM symbol X3 is input into the convolution filter 22. Processing by the convolution filter 22 on input OFDM symbols X2 and X3 in time periods T9 and T10 is the same as the processing on input OFDM symbols X1 and X2 in time periods T1 and T2. Data stored in the registers are illustrated in time periods T9 (clock cycle CLK=m+n) and T10 (clock cycle CLK=m+n+1) in FIG. 15.

In this way, the convolution filter 22 of the second embodiment previously stores as extension data Xc the data string at the head ends of the effective symbols Xt of OFDM symbols X that are input in sequence. After the data at the tail end of the current OFDM symbol X is input into the convolution filter 22, the convolution filter 22 performs a convolution operation on data strings having the stored extension data Xc added in sequence to the data at the tail end of the OFDM symbol. The process is repeated until the convolution operation on the data at the tail end of the symbol X has been completed. The process reduces intersymbol interference in the data string at the tail end of each symbol X as illustrated in FIG. 11.

Third Embodiment

As has been described, the cyclic prefix CP, which is a redundant signal, is added to the head end of an effective symbol Xt. However, in the communication field, the redundant signal is sometimes added to the tail end of an effective symbol Xt. In that case, the redundant signal is called cyclic postfix. As will be described below, a third embodiment addresses intersymbol interference between OFDM symbols X in which cyclic postfixes are added.

Figure 16:
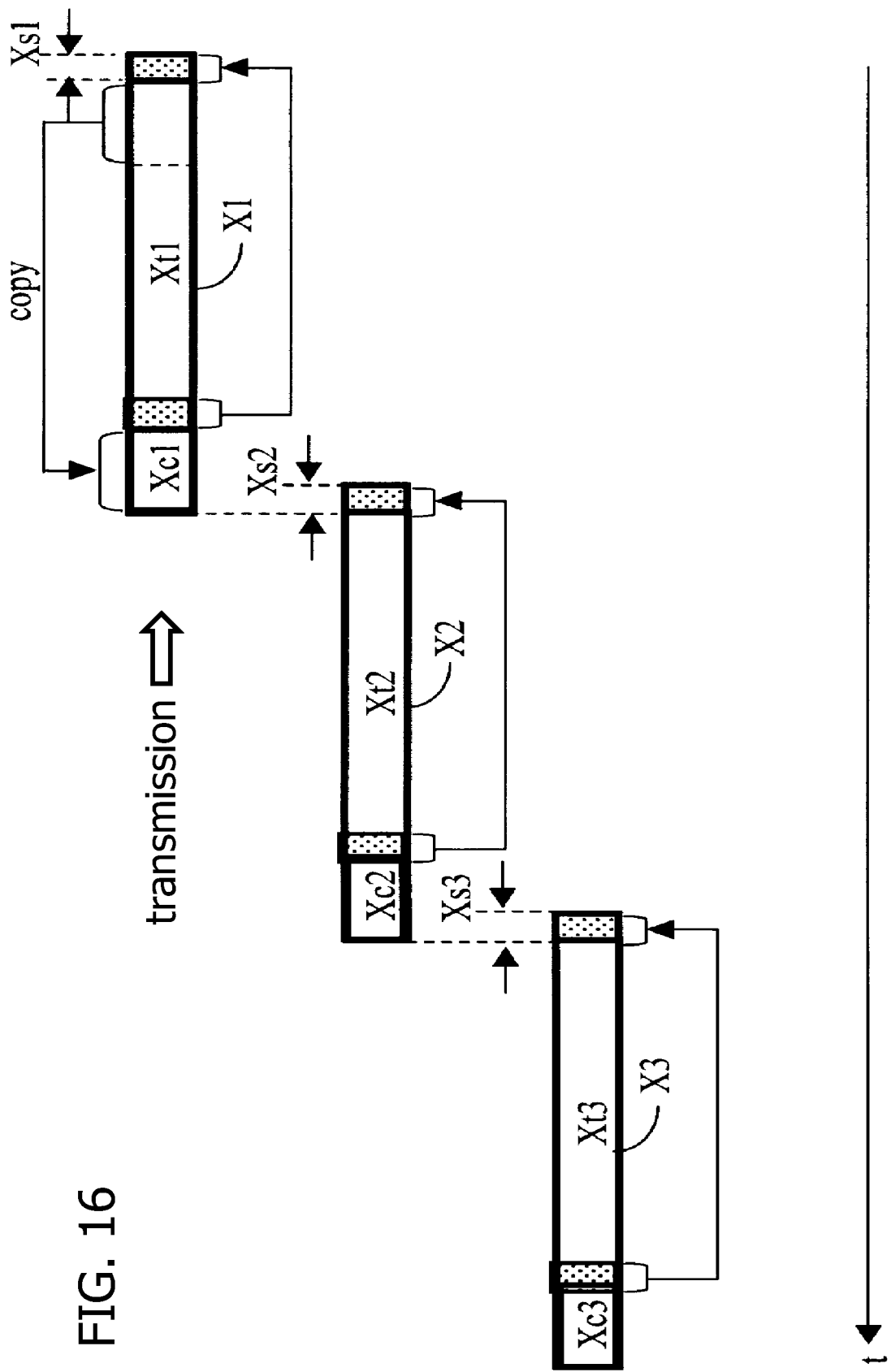
FIG. 16 is a diagram illustrating a procedure of processing performed on OFDM symbols X to which a cyclic postfix is added.

FIG. 16 illustrates a procedure of processing performed on OFDM symbols X to which cyclic postfixes are added. In FIG. 16, OFDM symbols X1, X2 and X3 to which cyclic postfixes Xc1, Xc2 and Xc3, respectively, have been added are input in sequence into a convolution filter 22. When a convolution operation is performed on the data string at the head end of each of OFDM symbols X1, X2 and X3, the data string at the tail end of each of effective symbols Xt1, Xt2 and Xt3 is sequentially added to the head end of each of OFDM symbols X1, X2 and X3, respectively, as extension data Xs1, Xs2 and Xs3. As stated above, extension data Xs1 has the same phase as the data string at the head end of OFDM symbol X1 and continuity with the data string. The extension data Xs1, Xs2 and Xs3 are used in convolution operations to reduce intersymbol interference in the convolution operations on the data strings at the head ends of OFDM symbols X1, X2 and X3.

Figure 17:
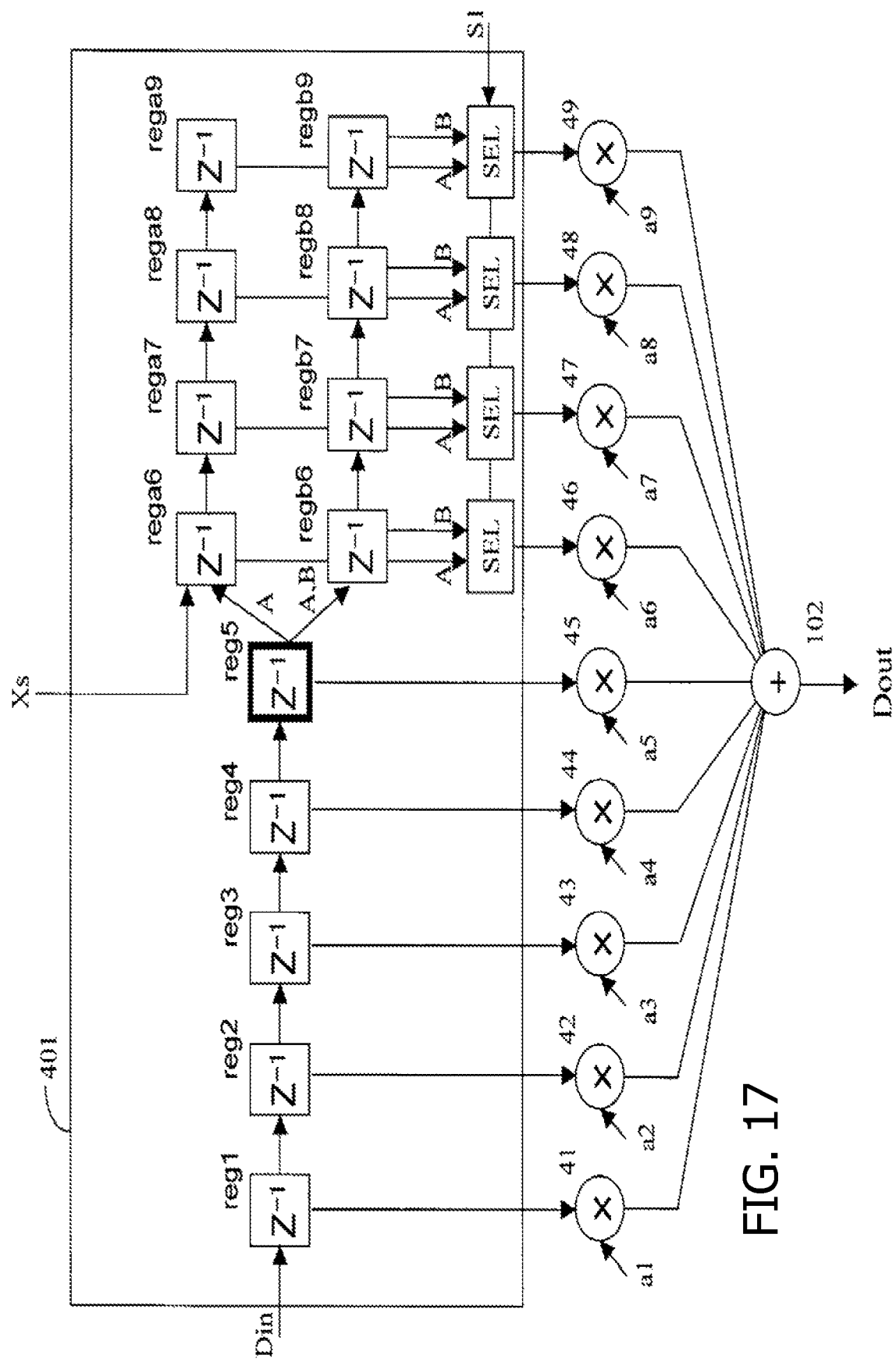
FIG. 17 is a block diagram illustrating a convolution filter 22 in a third embodiment.

FIG. 17 is a block diagram illustrating a convolution filter 22 according to the third embodiment. The convolution filter 22 is a variation of the first embodiment illustrated in FIG. 8. OFDM symbols X1, X2 and X3 with cyclic postfixes Xc1, Xc2 and Xc3 added are convolved in the way described above. The convolution filter 22 differs from the convolution filter 22 of the first embodiment in the internal configuration of a shift register 401.

The shift register 401 of the convolution filter 22 illustrated in FIG. 17 includes a center register stage reg5, a set of register stages rega6 to rega9 and a set of register stages regb6 to regb9 that follow the center register stage reg5 and are alternately selected, a set of register stages reg1 to reg4 that precede the center register stage reg5, and selectors SEL. The selectors SEL select register stages rega6 to rega9 or register stages regb6 to regb9 according to a selector control signal S1. As in the first embodiment, the convolution filter 22 performs a convolution operation on the data stored in register stages rega6 to rega9 or register stages regb6 to regb9 selected by the selectors SEL, and the data stored in register stages reg1 to reg5. The convolution filter 22 outputs the result of the convolution operation performed on the data in register stage reg5 as output data Dout.

Input data Din is input in register stage reg1 in sequence. The selector control signal S1 normally indicates "B". Data stored in register stage reg5 is shifted into register stage regb6 at each clock pulse. When the selector control signal S1 indicates "A", the data stored in register stage reg5 is shifted into both of register stages rega6 and regb6 at each clock pulse. The states of the convolution filter 22 in which the selector control signal S1 indicates "A" and "B" will be hereinafter referred to as "mode A" and "mode B", respectively. Extension data Xs are separately shifted into register stages rega6 to rega9 regardless of the selector control signal S1.

A case will be briefly described below in which the convolution filter circuit 22 of the third embodiment in FIG. 17 performs convolution operations on OFDM symbols X1, X2 and X3 in sequence. Here, data in which cyclic prefixes Xc1, Xc2 and Xc3 of OFDM symbols Xt1, Xt2 and Xt3 described above and illustrated in FIG. 5 are added to the tail ends of effective symbols Xt1, Xt2 and Xt3, respectively, as cyclic postfixes are input into the shift register 401 in sequence as input data Din.

As illustrated in FIG. 16, extension data Xs1, Xs2 and Xs3 are serially added to the data strings at the head ends of OFDM symbols X1, X2 and X3, respectively. The data strings at the head ends are convolved with their extension data Xs1, Xs2 and Xs3. Therefore, before storing the data at the head end of OFDM symbol X2 in register stage reg5 and performing a convolution operation, the convolution filter 22 of the third embodiment stores extension data Xs2 in register stages rega6 to rega9. The extension data are data strings at the tail ends of effective symbols Xt which have been temporarily stored in the CP adding section 12 in FIG. 1, for example.

At the data boundary between input OFDM symbols X1 and X2, the convolution filter 22, which is operating in mode B, performs a convolution operation on data stored in register stages reg1 to reg5 and data stored in register stage regb6 to regb9 in sequence. After data Xc1($m$) at the tail end of OFDM symbol X1 has been input in register stage reg1 as input data Din, data strings Xt2(1) . . . at the head end of different OFDM symbol X2 are shifted into register stage reg1 in sequence as input data Din. Accordingly, when data Xc1($m$) at the tail end of OFDM symbol X1 has been stored in register stage reg2, intersymbol interference occurs first in data Xc1($m$−3) which is stored in register stage reg5 and on which a convolution operation is to be performed. Then, similarly, data of OFDM symbol X2 are shifted into the shift register, and intersymbol interference continues to occur until the convolution operation is performed on data Xc1($m$) stored in register stage reg5. That is, intersymbol interference occurs in cyclic postfixes Xc1($m$−3) to Xc1($m$).

At the next clock pulse, data Xt2(1) at the head end of the OFDM symbol X2 is stored in register stage reg5, then the convolution filter 22 changes to mode A. The convolution filter 22 performs a convolution operation on OFDM symbol data Xt2(5) to Xt2(1) stored in register stages reg1 to reg5 and extension data Xs2 described above, stored in register stages rega6 to rega9. These data are of the same OFDM symbol X2 and therefore have continuity. Accordingly, data Xt2(1) in register stage reg5 on which the convolution operation is performed does not cause intersymbol interference.

The convolution filter 22 continues operating in mode A. At the next clock pulse, data Xt2(1) is shifted into register stages rega6 and regb6 and a convolution operation is performed on data Xt2(2) stored in register stage reg5. Here, data Xt2(2) also does not cause intersymbol interference. The convolution filter 22 continues operating in mode A until data Xt2(1) at the head end of OFDM symbol X2 is stored in register stage rega9.

Then, the convolution filter 22 changes to mode B. The data stored in register stages reg1 to reg5 and regb6 to regb9 are head end data strings Xt2(1) to Xt(9) of the same OFDM symbol X2. Therefore data Xt2(5) stored in register stage reg5 on which the convolution operation is performed does not cause intersymbol interference.

The convolution filter 22 continues operating in mode B until the symbol boundary between OFDM symbols X2 and X3 is reached. In this period, effective symbols Xt of OFDM symbol X2 do not cause intersymbol interference. Extension data Xs3 are stored in register stages rega6 to rega9 before the start of a convolution operation on OFDM symbol X3.

Figure 18:
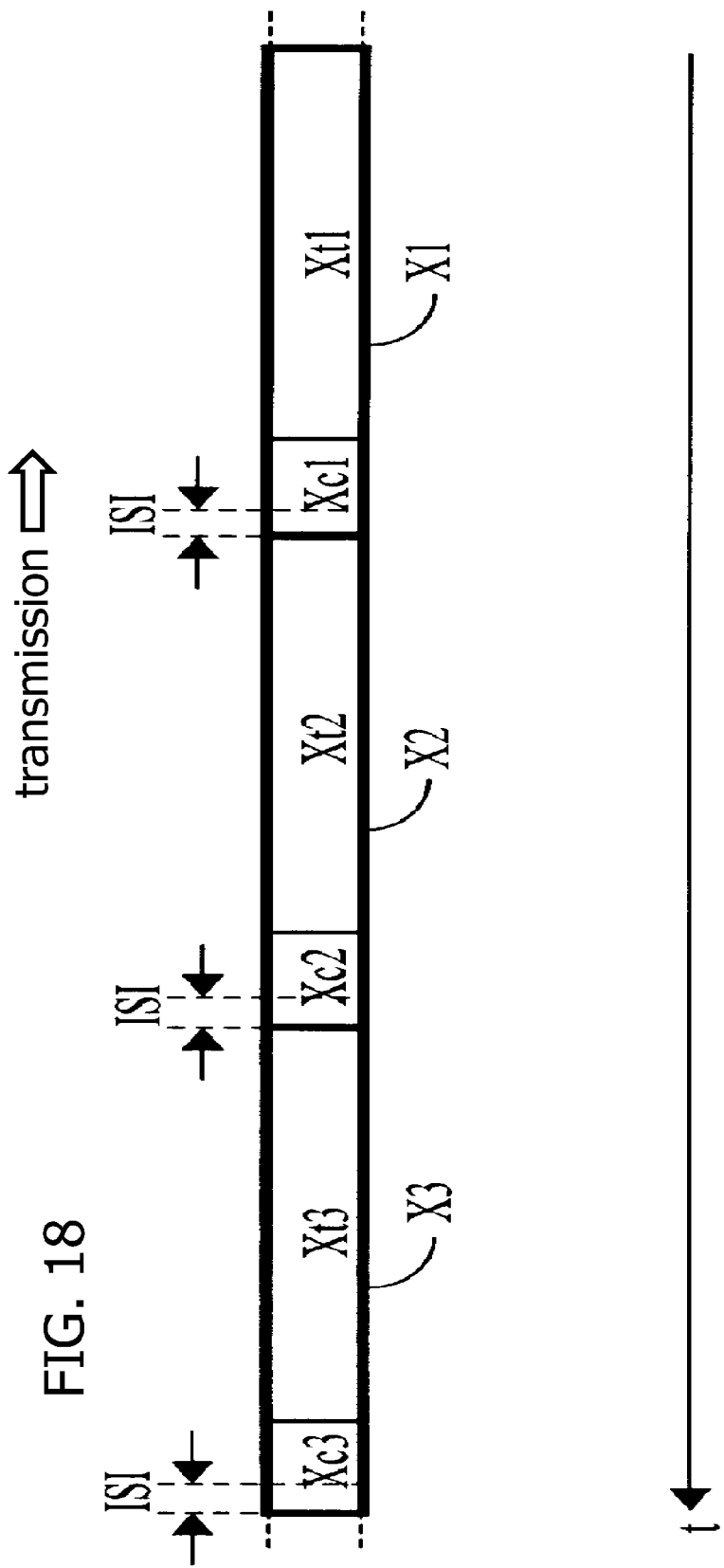
FIG. 18 is a diagram illustrating intersymbol interference ISI resulting from convolution of OFDM symbols X1, X2, . . . to which a cyclic postfix is added.

FIG. 18 illustrates intersymbol interference ISI that occurs in convolution operations on OFDM symbols X1, X2, . . . with cyclic postfixes added. Intersymbol interference occurs in the data string at the tail end of each cyclic postfix Xc of OFDM symbols X1, X2, . . . generated in sequence. Like cyclic prefixes, the cyclic postfixes Xc will be removed at the receiving end and therefore intersymbol interference in the data does not affect transmission conditions.

Figure 19A:
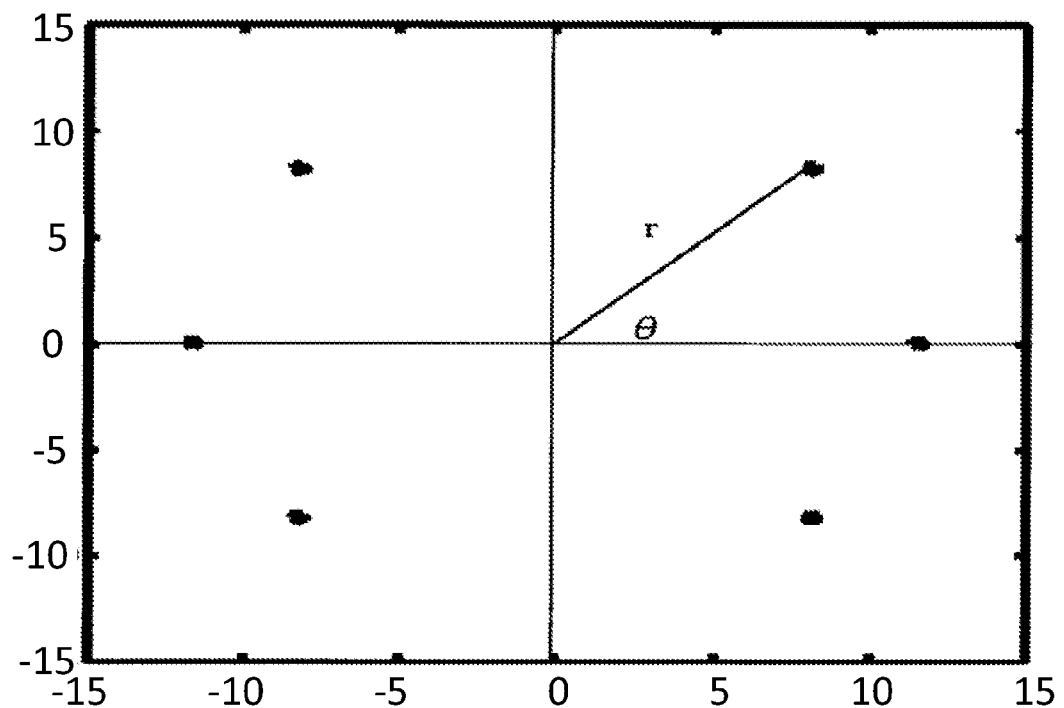
FIGS. 19A and 19B are diagrams for explaining the effects of convolution operations in the first to third embodiments.
Figure 19B:
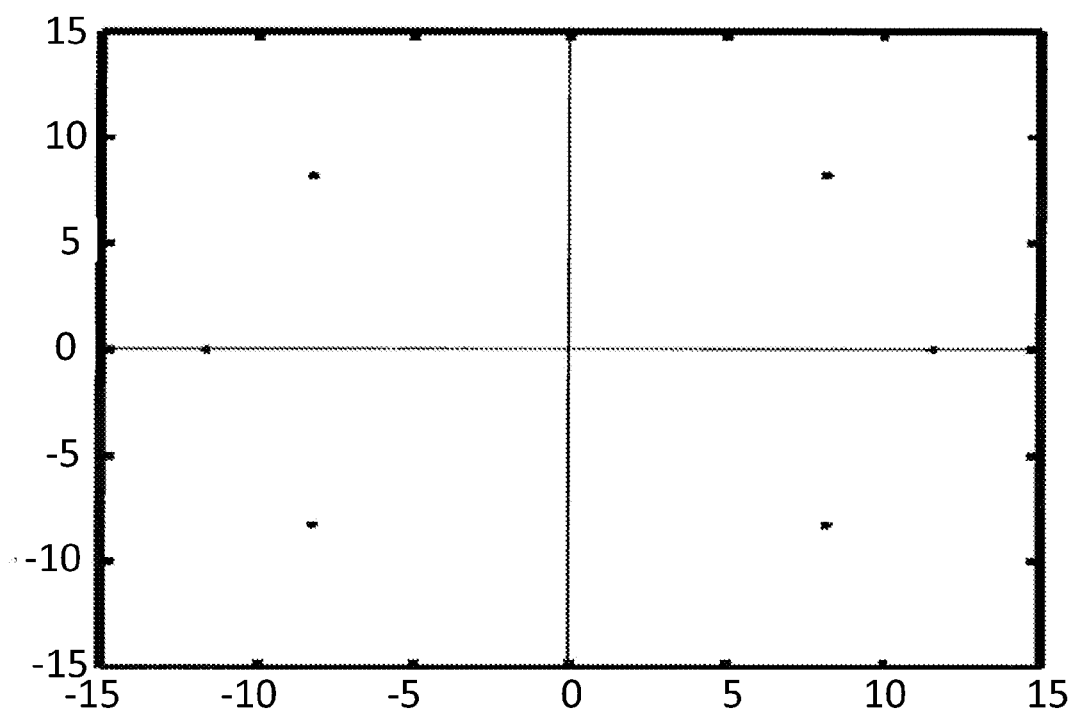

FIGS. 19A and 19B illustrate effects of convolution operations in the first to third embodiments. In the stage preceding the IFFT section 11 in FIG. 1 in which multiple frequency-domain signals Sf to be input into the IFFT section 11 are generated, bit-sequence transmitter data is mapped to signal points which are determined by phase and power (amplitude). FIG. 19 is a diagram illustrating phases of transmitter data mapped using Binary Phase Shift Keying (BPSK) and Quadrature Phase Shift Keying (QPSK) and demapped at a receiving end.

FIG. 19A illustrates the result of a simulation of the conventional convolution filter 22 illustrated in FIG. 4; FIG. 19B illustrates the result of a simulation of the convolution filter 22 of the present embodiments illustrated in FIG. 12 and other drawings. The number of taps (register stages) is 41 in both simulations. FIGS. 19A and 19B illustrate signal degradation caused by influence of intersymbol interference in the convolution filters 22 without the influence of interference and other factors due to multipath transmission since the signals are simulated signals.

Each of the demapped signal points has amplitude r and phase θ information. Comparison of the signal points in FIGS. 19A and 19B indicates that the signal points obtained using the convolution filter 22 of the present embodiment in FIG. 19B are more convergent. Furthermore, the distribution of the signal points in FIG. 19A represented by Relative Constellation Error (RCE) is −49.47 dB and that in FIG. 19B is −310.88 dB. From the result, it may be seen that signal degradation in processing in the convolution filter 22 at the sending end has been reduced.

As has been described above, in the transmitter of any of the present embodiments, when a convolution operation is performed on the data string at the tail end of an effective symbol with a cyclic prefix added at its head, extension data at the head end of the effective symbol is added to the data string at the tail end. This may prevent the data string from being interfered with a data string of the subsequent symbol. Furthermore, when a convolution operation is performed on a data string at the head end of an effective symbol with a cyclic postfix added at its tail end, extension data at the tail end of the effective symbol is added to the data string at the head end. This may prevent the data string from being interfered with a data string of the preceding symbol.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmitter transmitting a modulation wave, the transmitter comprising:
   an OFDM symbol generator for generating an effective symbol including a plurality of sub-carriers orthogonal to each other in frequency by applying inverse Fourier transform to a plurality of transmitter signals, and sequentially generating an OFDM symbol in which a signal in a first period from a first end of the effective symbol is added to a second end of the effective symbol as a guard interval, the second end being the other end of the effective symbol; and
   a convolution filter for performing an convolution operation on data strings at a plurality of sampling points of the OFDM symbol, the convolution operation being performed on as many first data strings as a certain number of taps at a time;
   wherein when the convolution filter performs a convolution operation on the first data strings including a data string at the first end of the effective symbol, the convolution filter performs the convolution operation on the first data strings in which a data string at the second end of the effective symbol is cyclically added to a data string at the first end,
   wherein the convolution filter comprises a shift register into which data strings of the OFDM symbol are input in sequence, an operation section performing a convolution operation on the first data strings as many as the certain number of taps in the shift register, and a storage section storing the data string at the second end;
   wherein when the operation section performs a convolution operation on the first data strings including a data string at the first end of the effective symbol, the operation section performs the convolution operation on the data string at the first end in the shift register and the data string at the second end in the storage section.

2. The transmitter according to claim 1, comprising:
   an upsampling section for adding an additional sampling point between sampling points of the OFDM symbol generated by the OFDM symbol generator and outputting an upsampled OFDM symbol to the convolution filter; and
   a digital-to-analog converter for converting a data string of the OFDM symbol on which a convolution operation has been performed by the convolution filter to an analog data string.

3. The transmitter according to claim 1, wherein the operation section comprises a multiplier multiplying the first data strings by a certain coefficient and an adder adding results of the multiplications together, and the certain coefficient causes the convolution filter to function as a low-pass filter.

4. The transmitter according to claim 1, wherein the first end of the effective symbol is the tail end of the effective symbol, the second end of the effective symbol is a head end of the effective symbol, and the guard interval is prefixed to the head end of the effective symbol.

5. The transmitter according to claim 2, wherein the first end of the effective symbol is the tail end of the effective symbol, the second end of the effective symbol is a head end of the effective symbol, and the guard interval is prefixed to the head end of the effective symbol.

6. The transmitter according to claim 1, wherein the first end of the effective symbol is the tail end of the effective symbol, the second end of the effective symbol is a head end of the effective symbol, and the guard interval is prefixed to the head end of the effective symbol.

7. The transmitter according to claim 3, wherein the first end of the effective symbol is the tail end of the effective symbol, the second end of the effective symbol is a head end of the effective symbol, and the guard interval is prefixed to the head end of the effective symbol.

8. The transmitter according to claim 1, wherein the first end of the effective symbol is the head end of the effective symbol, the second end of the effective symbol is the tail end of the effective symbol, and the guard interval is postfixed to the tail end of the effective symbol.

9. The transmitter according to claim 2, wherein the first end of the effective symbol is the head end of the effective symbol, the second end of the effective symbol is the tail end of the effective symbol, and the guard interval is postfixed to the tail end of the effective symbol.

10. The transmitter according to claim 1, wherein the first end of the effective symbol is the head end of the effective symbol, the second end of the effective symbol is the tail end of the effective symbol, and the guard interval is postfixed to the tail end of the effective symbol.

11. The transmitter according to claim 3, wherein the first end of the effective symbol is the head end of the effective symbol, the second end of the effective symbol is the tail end of the effective symbol, and the guard interval is postfixed to the tail end of the effective symbol.

* * * * *